United States Patent
Sung et al.

(10) Patent No.: US 10,961,890 B2
(45) Date of Patent: Mar. 30, 2021

(54) ON-BOARD VEHICLE AMMONIA AND HYDROGEN GENERATION

(71) Applicant: BASF CORPORATION, Florham Park, NJ (US)

(72) Inventors: Shiang Sung, New York, NY (US); Michael Locascio, Randolph, NJ (US); Yuejin Li, Edison, NJ (US)

(73) Assignee: BASF Corporation, Florham Park, NJ (US)

(*) Notice: Subject to any disclaimer, the term of this patent is extended or adjusted under 35 U.S.C. 154(b) by 0 days.

(21) Appl. No.: 16/590,715

(22) Filed: Oct. 2, 2019

(65) Prior Publication Data

US 2020/0032689 A1    Jan. 30, 2020

Related U.S. Application Data

(63) Continuation of application No. PCT/IB2018/052303, filed on Apr. 3, 2018.

(60) Provisional application No. 62/481,232, filed on Apr. 4, 2017, provisional application No. 62/481,269, filed on Apr. 4, 2017.

(51) Int. Cl.
　　*F01N 3/20*　　(2006.01)
　　*B01D 53/90*　　(2006.01)
　　*B01D 71/02*　　(2006.01)

(52) U.S. Cl.
CPC .......... *F01N 3/2066* (2013.01); *B01D 53/90* (2013.01); *B01D 71/022* (2013.01); *B01D 2258/01* (2013.01); *F01N 2610/02* (2013.01)

(58) Field of Classification Search
CPC .... F01N 2610/04; F01N 3/103; F01N 3/2066; F01N 3/206; F01N 2240/32; F01N 2370/00; F01N 2610/00; B01D 53/9409; B01D 53/9418; B01D 53/944; B01D 2251/202; B01D 2257/404; B01D 2257/502; B01D 2257/702; B01D 2258/012; B01J 7/00; C01B 3/047
See application file for complete search history.

(56) References Cited

U.S. PATENT DOCUMENTS

| | | | |
|---|---|---|---|
| 3,030,181 | A | 4/1962 | Milton |
| 4,440,871 | A | 4/1984 | Lok et al. |
| 4,544,538 | A | 10/1985 | Zones et al. |
| 5,407,761 | A | 4/1995 | Ovshinsky et al. |
| 6,162,415 | A | 12/2000 | Liu et al. |
| 6,171,556 | B1 | 1/2001 | Burk et al. |
| 6,193,929 | B1 | 2/2001 | Ovshinsky et al. |
| 6,709,644 | B2 | 3/2004 | Zones et al. |
| 6,871,491 | B2* | 3/2005 | Breuer ............... B01D 53/9431 60/286 |
| 7,229,597 | B2 | 6/2007 | Patchett et al. |
| 7,264,789 | B1 | 9/2007 | Verduijn et al. |
| 7,704,475 | B2 | 4/2010 | Bull et al. |
| 7,998,423 | B2 | 8/2011 | Boorse et al. |
| 8,178,064 | B2* | 5/2012 | Koermer ............ B01D 53/9409 423/239.1 |
| 8,404,203 | B2 | 3/2013 | Ludwigshafen et al. |
| 8,475,722 | B2 | 7/2013 | Nakanishi et al. |
| 9,011,807 | B2 | 4/2015 | Mohanan et al. |
| 9,017,626 | B2 | 4/2015 | Tang et al. |
| 9,242,238 | B2 | 1/2016 | Mohanan et al. |
| 9,321,042 | B2 | 4/2016 | Hoke et al. |
| 9,352,307 | B2 | 5/2016 | Stiebels et al. |
| 9,517,456 | B2 | 12/2016 | Patchett et al. |
| 9,757,717 | B2 | 9/2017 | Patchett et al. |
| 2001/0049339 | A1 | 12/2001 | Schafer-Sindlinger et al. |
| 2002/0002905 | A1 | 1/2002 | Umino et al. |
| 2002/0166546 | A1 | 11/2002 | Andrews et al. |
| 2003/0234011 | A1 | 12/2003 | Breuer et al. |
| 2004/0088970 | A1* | 5/2004 | Mulligan ........... F02M 21/0227 60/286 |
| 2004/0234430 | A1* | 11/2004 | Yamato ..................... F01N 3/20 422/186.04 |
| 2004/0241507 | A1 | 12/2004 | Schubert et al. |

(Continued)

FOREIGN PATENT DOCUMENTS

| | | |
|---|---|---|
| DE | 4103668 | 8/1992 |
| EP | 0640378 B1 | 10/1996 |

(Continued)

OTHER PUBLICATIONS

Alfred K. Hill, Laura Torrente-Murciano; "Low temperature $H_2$ production from ammonia using ruthenium-based catalysts: Synergetic effect of promoter and support," Applied Catalysis B: Environmental 172-173 (2015) 129-135

N. Itoh, A. Oshima, E. Suga, T. Sato;"Kinetic enhancement of ammonia decomposition as a chemical hydrogen carrier in palladium membrane reactor," Catalysis Today 236 (2014) 70-76.

William I. F. David, Joshua W. Makepeace, Samantha K. Callear, Hazel M. A. Hunter, James D. Taylor, Thomas J. Wood, Martin O. Jones, J, "Hydrogen productlon from ammonia using sodium amide,", Am. Chem. Soc. 2014, 136 (38).

(Continued)

*Primary Examiner* — Timothy C Vanoy

(74) *Attorney, Agent, or Firm* — Finnegan, Henderson, Farabow, Garrett & Dunner, LLP

(57) ABSTRACT

An on-board vehicle reservoir containing an ammonia/organic solvent solution may be associated with a phase separator configured to isolate ammonia from the solution. The ammonia may be introduced into an exhaust gas stream of an internal combustion engine to function as a catalytic reductant. Ammonia may be employed to generate hydrogen via catalytic decomposition of ammonia, and the hydrogen may be introduced into an exhaust gas stream to aid catalytic reactions such as catalytic oxidation of carbon monoxide (CO) and/or hydrocarbon (HC) and/or reduction of nitrogen oxides (NO); for instance during a cold-start period.

18 Claims, 13 Drawing Sheets

(56) References Cited

U.S. PATENT DOCUMENTS

| | | | |
|---|---|---|---|
| 2005/0287049 A1* | 12/2005 | Benz | B01B 1/005 422/173 |
| 2006/0179820 A1* | 8/2006 | Sullivan | F01N 3/18 60/275 |
| 2006/0248876 A1* | 11/2006 | Taxon | F01N 3/206 60/275 |
| 2007/0246351 A1 | 10/2007 | Smola et al. | |
| 2007/0274892 A1* | 11/2007 | Duvinage | F01N 3/2006 423/239.2 |
| 2008/0003470 A1 | 1/2008 | Christenson et al. | |
| 2008/0196588 A1 | 8/2008 | Gretta et al. | |
| 2008/0241033 A1 | 10/2008 | Nazri | |
| 2008/0257751 A1 | 10/2008 | Smola et al. | |
| 2008/0274873 A1 | 11/2008 | Schubert et al. | |
| 2009/0107116 A1 | 4/2009 | Barber et al. | |
| 2009/0263296 A1 | 10/2009 | Taques | |
| 2009/0285740 A1 | 11/2009 | Sobolevskiy et al. | |
| 2010/0024403 A1 | 2/2010 | Johannessen et al. | |
| 2010/0024542 A1 | 5/2010 | Yen et al. | |
| 2010/0186375 A1 | 7/2010 | Kazi et al. | |
| 2010/0251700 A1 | 10/2010 | Wan et al. | |
| 2011/0008694 A1 | 1/2011 | Tange et al. | |
| 2011/0011354 A1 | 1/2011 | Dincer et al. | |
| 2011/0236790 A1 | 9/2011 | Schubert et al. | |
| 2013/0047584 A1 | 2/2013 | Park | |
| 2014/0363358 A1 | 12/2014 | Udd et al. | |
| 2016/0038876 A1* | 2/2016 | Andersen | B01D 53/56 422/171 |
| 2016/0136626 A1 | 5/2016 | Phillips et al. | |
| 2016/0230255 A1 | 8/2016 | Young et al. | |
| 2016/0298514 A1 | 10/2016 | Raux | |
| 2016/0310897 A1 | 10/2016 | Tsuji et al. | |
| 2016/0340182 A1 | 11/2016 | Hosono et al. | |
| 2016/0348556 A1 | 12/2016 | Suyama | |
| 2018/0128147 A1* | 5/2018 | Fujiwara | F01N 3/2066 |
| 2018/0195469 A1* | 7/2018 | Hamad | F02D 19/0644 |

FOREIGN PATENT DOCUMENTS

| | | | | |
|---|---|---|---|---|
| EP | 2230001 | | 9/2010 | |
| FR | 2941499 | | 7/2011 | |
| GB | 868 846 | * | 5/1961 | C01B 1/03 |
| JP | H06146873 | | 5/1994 | |
| JP | 2006136776 | | 6/2006 | |
| JP | 2010203335 | | 6/2006 | |
| JP | 2010203335 | | 9/2010 | |
| KR | 970070445 | | 11/1997 | |
| KR | 20050115420 | | 12/2005 | |
| KR | 20100098143 | | 9/2010 | |
| KR | 101076841 | | 10/2011 | |
| KR | 101553587 | | 9/2015 | |
| WO | WO2014073576 | | 5/2014 | |
| WO | WO 2015145181 A1 | * | 10/2015 | B01J 29/48 |
| WO | WO2016034401 | | 3/2016 | |
| WO | WO 2016/070090 | | 6/2016 | |
| WO | WO2016138418 | | 9/2016 | |
| WO | WO2017019958 | | 2/2017 | |
| WO | WO2018185661 | | 10/2018 | |

OTHER PUBLICATIONS

Irena Short, Ashok Sahgal, Walter Hayduk, "Solubility of ammonia and hydrogen sulfide in several polar solvents,", J. Chem. Eng. Data 1983, v28(1), 63-66.

"Ammonia for fuel update," New Energy and Fuel, Blog entry published Oct. 18, 2011; available online at https://newenergyandfuel.com/http:/newenergyandfuel.com/2011/10/18/ammonia-for-fuel.

"Why on-board hydrogen generators won't boost your mileage," Blog entry published Aug. 4, 2008; available at https://www.autoblog.com/2008/08/04/why-on-board-hydrogen- generators-wont-boost-your-mileage/.

Kim et al."DevelopInent on New Catalyst Technology for Compact SCR Modularization for Ship", The Korean Society of Industrial and Engineering Chemistry 2016 Spring Meeting.

Supplementary European Search Report dated Jul. 29, 2020 for European Application No. EP 18 78 1594.

International Search Report dated Jul. 24, 2018 for PCT/IB2018/05203.

* cited by examiner

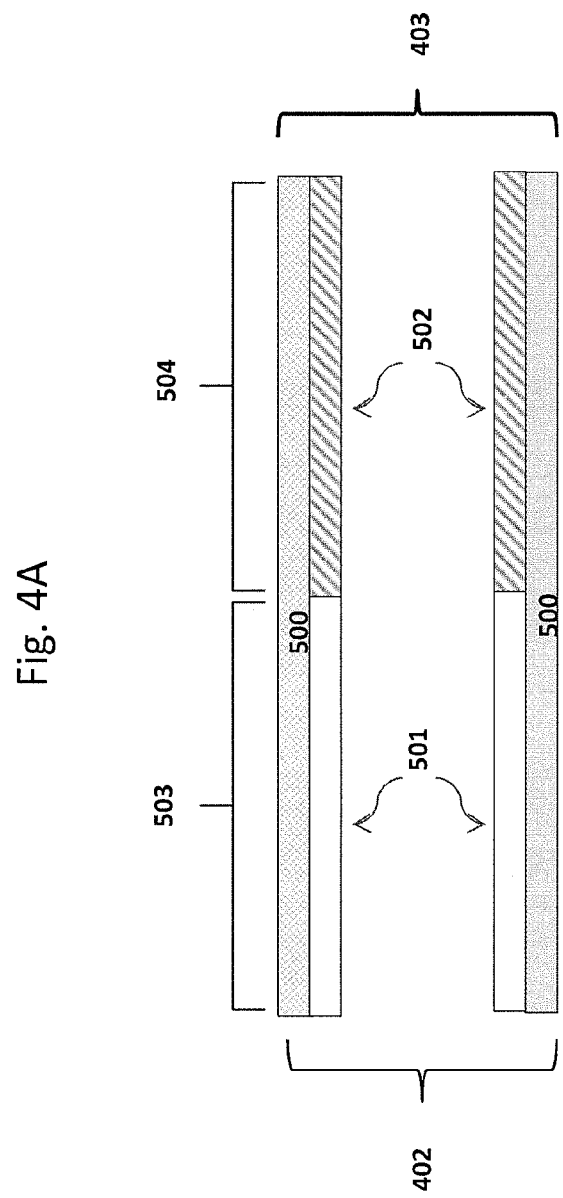

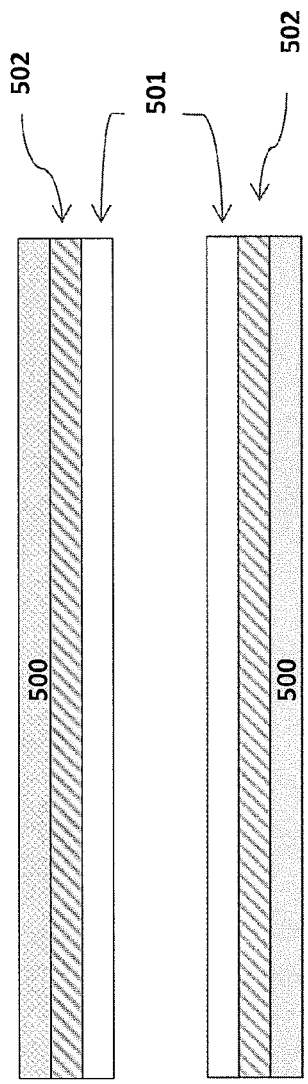

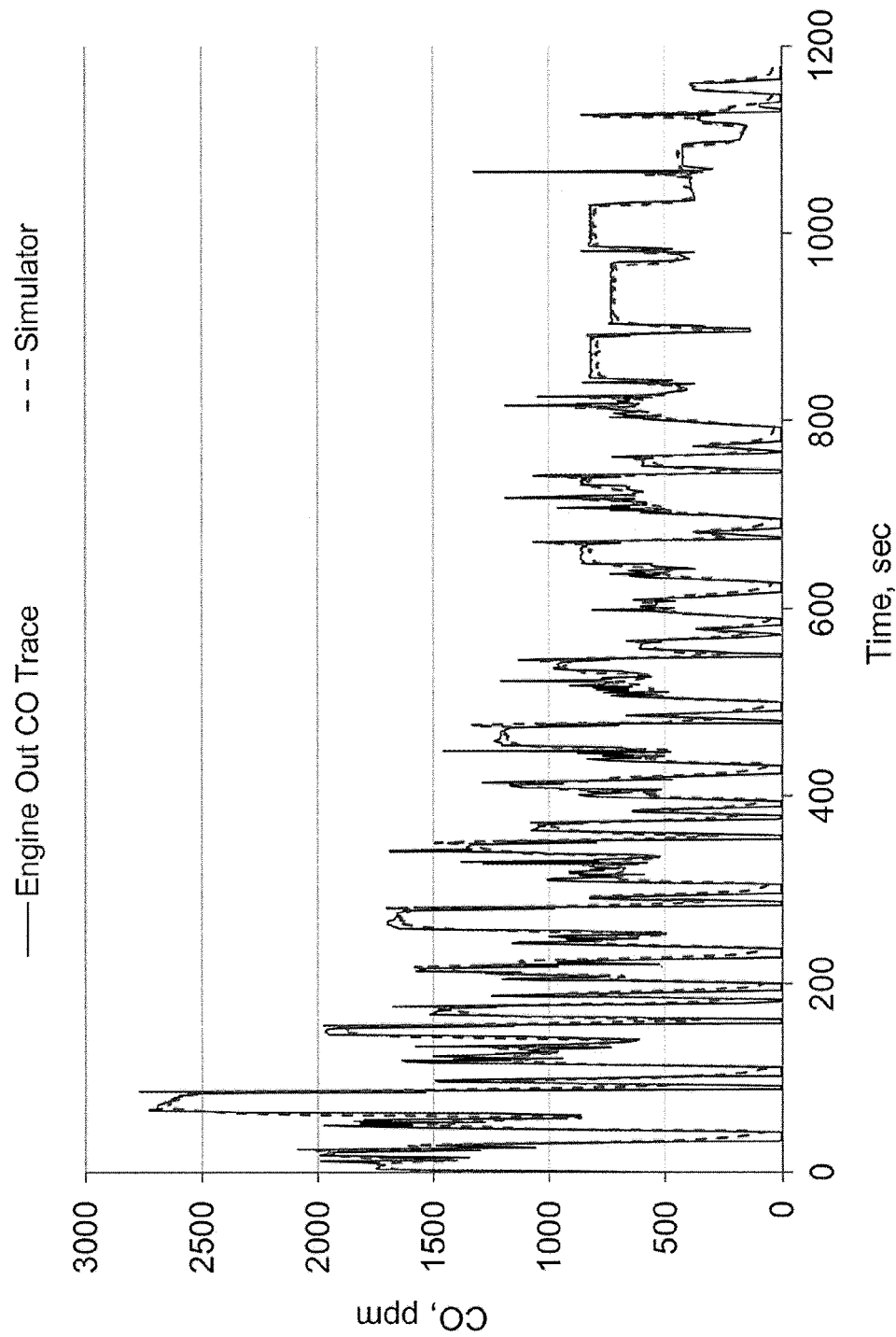

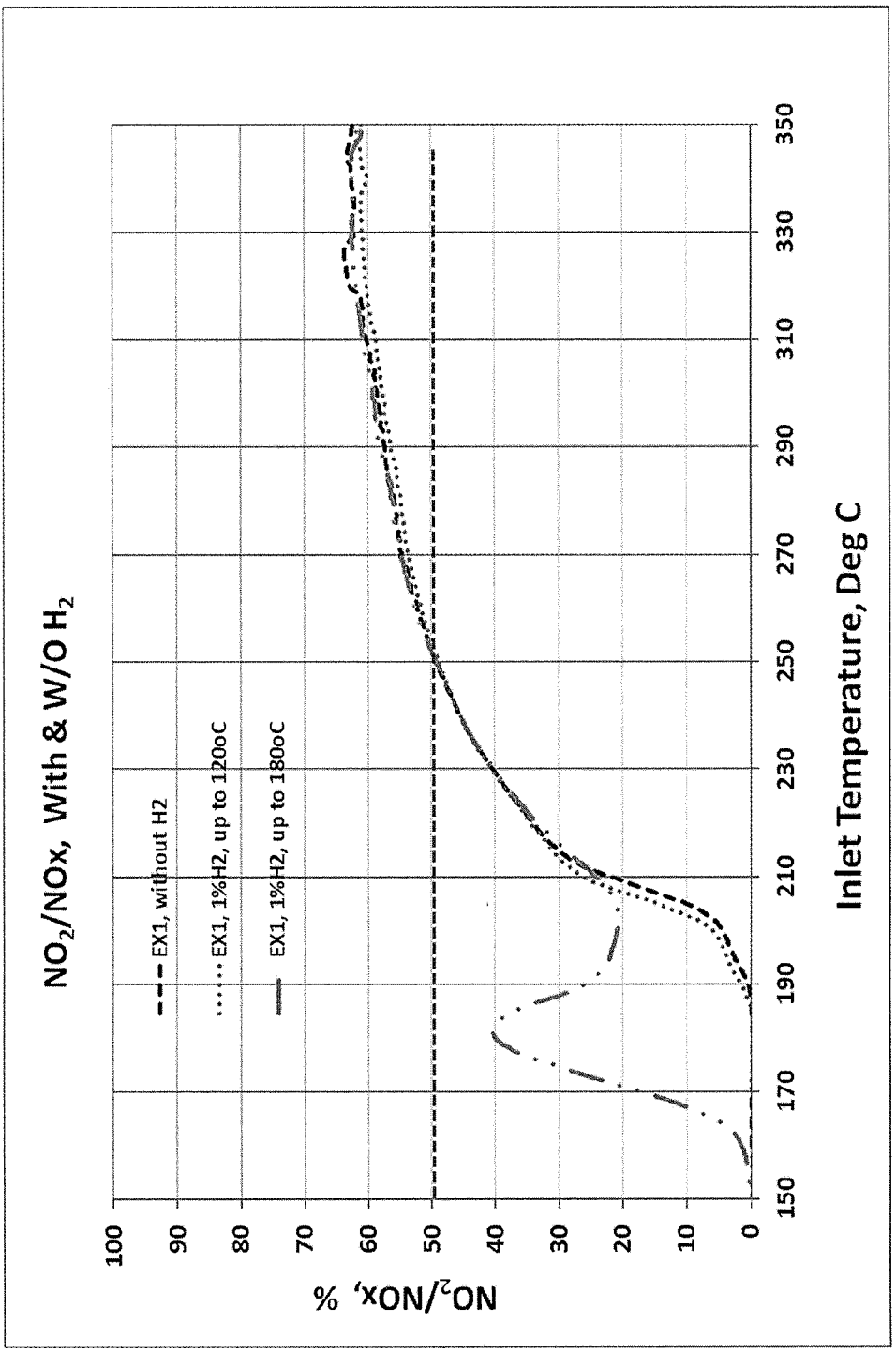

ON-BOARD VEHICLE AMMONIA AND HYDROGEN GENERATION

CROSS-REFERENCE TO RELATED APPLICATIONS

This application is a continuation of International Application No. PCT/IB2018/052303; filed Apr. 3, 2018, which International Application was published by the International Bureau in English on Oct. 11, 2018, and which claims priority to U.S. Provisional Application No. 62/481,232, filed on Apr. 4, 2017, and U.S. Provisional Application No. 62/481,269, filed on Apr. 4, 2017, the content of each of which is hereby incorporated by reference in its entirety.

FIELD OF THE INVENTION

The invention is aimed at systems, articles, and methods for on-board vehicle ammonia generation for use as a reductant in an exhaust gas stream of an internal combustion engine. The invention is also aimed at systems, articles, and methods for on-board hydrogen generation from ammonia.

BACKGROUND OF THE INVENTION

Environmental regulations for emissions of internal combustion engines are becoming increasingly stringent throughout the world.

Operating of a lean-burn engine, for example a diesel engine, provides the user with excellent fuel economy due to their operation at high air/fuel ratios under fuel lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitrogen monoxide and nitrogen dioxide, among others. The two major components of exhaust particulate matter are the soluble organic fraction (SOF) and the soot fraction. The SOF condenses on the soot in layers and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalysts comprising a precious metal, such as platinum group metals (PGM), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from diesel power systems to treat tire exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOF portion), oxidation catalysts that contain PGM promote the oxidation of NO to $NO_2$. Catalysts are typically defined by their light-off temperature or the temperature at which 50% conversion is attained, also called $T_{50}$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, it is known in the art to include a sorbent material, which may be a zeolite, as part of a catalytic treatment system in order to adsorb and/or absorb gaseous pollutants, usually hydrocarbons, and retain them during the initial cold-start period. As the exhaust gas temperature increases, the stored hydrocarbons are driven from the sorbent and subjected to catalytic treatment at the higher temperature.

$NO_x$ is contained m exhaust gases, such as from internal combustion engines (e.g., in automobiles and trucks), from combustion installations (e.g., power stations heated by natural gas, oil, or coal), and from nitric acid production plants. Various treatment methods have been used for the treatment of $NO_x$-containing gas mixtures to decrease atmospheric pollution.

One effective method to reduce $NO_x$ from the exhaust of lean-burn engines, such as gasoline direct injection and partial lean-burn engines, as well as from diesel engines, requires trapping and storing of $NO_x$ under lean burn engine operating conditions and reducing the trapped $NO_x$ under stoichiometric or rich engine operating conditions or under lean engine operation with external fuel injected in the exhaust to induce rich conditions. The lean operating cycle is typically between 1 minute and 20 minutes and the rich operating cycle is typically short (1 to 10 seconds) to preserve as much fuel as possible. To enhance $NO_x$ conversion efficiency, the short and frequent regeneration is favored over long but less frequent regeneration. Thus, a lean $NO_x$ trap catalyst generally must provide a $NO_x$ trapping function and a three-way conversion function. Three-way conversion (TWC) generally refers to convening HC+CO to $CO_2+H_2O$ and $NO_x$ to $N_2$ reduction.

Some lean $NO_x$ trap (LNT) systems contain alkaline earth elements. For example $NO_x$ sorbent components include alkaline earth metal oxides, such as oxides of Mg, Ca, Sr or Ba. Other LNT systems con contain rare earth metal oxide such as oxides of Ce, La, Pr or Nd. The $NO_x$ sorbents can be used in combination with platinum group metal catalysts such as platinum dispersed on an alumina support for catalytic $NO_x$ oxidation and reduction. The LNT catalyst operates under cyclic lean (trapping mode) and rich (regeneration mode) exhaust conditions during which the engine out NO is converted to $N_2$.

Another effective method to reduce $NO_x$ from the exhaust of lean-burn engines requires reaction of $NO_x$ under lean burn engine operating conditions with a suitable reductant such as ammonia or hydrocarbon in the presence of a selective catalytic reduction (SCR) catalyst. The SCR process uses catalytic reduction of nitrogen oxides with a reductant (e.g., ammonia) in the presence of atmospheric oxygen, resulting in the formation predominantly of nitrogen and steam:

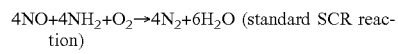
4NO+4NH$_2$+O$_2$→4N$_2$+6H$_2$O (standard SCR reaction)

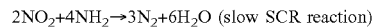
2NO$_2$+4NH$_2$→3N$_2$+6H$_2$O (slow SCR reaction)

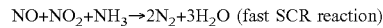
NO+NO$_2$+NH$_3$→2N$_2$+3H$_2$O (fast SCR reaction)

Current catalysts employed in the SCR process include molecular sieves, such as zeolites, ion-exchanged with a catalytic metal such as iron or copper. A useful SCR catalyst composition is able to effectively catalyze the reduction of the $NO_x$ exhaust component at temperatures below 600° C., so that reduced $NO_x$ levels can be achieved even under conditions of low load which typically are associated with lower exhaust temperatures.

Conventional SCR catalyst emission control systems used for diesel engines provide ammonia necessary for the above-noted SCR reactions by injecting diesel exhaust fluid, a mixture of urea and water, into the exhaust stream upstream of the SCR catalyst. The urea decomposes in the exhaust stream to produce ammonia and carbon dioxide. However, urea decomposition requires temperatures of about 180° C. or higher, and diesel exhaust fluid systems also typically require a relatively long channel for optimal mixing and/or a high turbulence mixing area prior to entry into the SCR catalyst unit. Still further, urea deposits can occur in such systems, particularly during low temperature operation. Accordingly, use of diesel exhaust fluid as the ammonia source presents challenges and increases system complexity, particularly in cold environments where heating of the diesel exhaust fluid is required.

Increasingly stringent emissions regulations have driven the need for developing emission gas treatment systems with improved CO, HC and NO oxidation capacity to manage CO, HC and NO emissions at low engine exhaust temperatures. In addition, development of emission gas treatment systems for the reduction of NO, (NO and $NO_2$) emissions to nitrogen has become increasingly important. There remains a need in the art for improved systems for delivering the necessary reductant for SCR catalyst function in emission control systems.

SUMMARY OF THE INVENTION

The present invention is aimed at on-board vehicle ammonia storage and generation for use as a reductant in exhaust gas streams of internal combustion engines and for use as a source of hydrogen. Generated hydrogen may serve to aid oxidation of CO and/or HC and or $NO_2/NO_x$, formation in no exhaust gas stream, especially during a cold-start period. Hydrogen reductant is, for example, suitable to regenerate precious metals, for instance precious metals present in a diesel oxidation catalyst (DOC).

The disclosure provides an emission control system and related method for treatment of an exhaust gas stream of an engine that includes use of an ammonia generation system adapted to provide ammonia for injection into the exhaust gas stream as a reductant for a downstream SCR catalyst, wherein the ammonia generation system utilizes an ammonia/organic solvent solution as the source of ammonia. Use of an ammonia/organic solvent solution offers numerous advantages over conventional diesel exhaust fluid systems, including improved low temperature performance.

Accordingly, in one aspect is provided a vehicle on-board system comprising an ammonia source and a catalytic reactor in fluid communication with the ammonia source and configured to decompose ammonia from the ammonia source to generate hydrogen.

In some embodiments, the ammonia source comprises a lank configured to store and release ammonia. In some embodiments, the ammonia source comprises a reservoir comprising an ammonia/organic solvent solution. In some embodiments, the ammonia/organic solvent solution comprises from about 1% to about 70% ammonia by weight, based on the weight of the ammonia/organic solvent solution, and the organic solvent comprises an alkanol and/or a glycol. In some embodiments, the vehicle on-board system further comprises a phase separator configured to isolate ammonia from the ammonia/organic solvent solution. In some embodiments, the vehicle on-board system further comprises an ammonia storage container associated with the phase separator. In some embodiments, the ammonia storage container further comprises a hydrophobic zeolite to store ammonia. In some embodiments, the hydrophobic zeolite is clinoptilolite.

In some embodiments, the catalytic reactor comprises an ammonia decomposition catalyst disposed on one or more surfaces contained within the catalytic reactor. In some embodiments, the catalytic reactor further comprises a hydrogen separation membrane.

In some embodiments, the vehicle on-board system further comprises a hydrogen storage article. In some embodiments, the system further comprises a hydrogen injection article configured to introduce hydrogen intermittently on-demand into an exhaust gas stream of an internal combustion engine. In some embodiments, the vehicle on-board system further comprises an ammonia injection article, wherein the ammonia injection article is in fluid communication with a selective catalytic reduction (SCR) article and is configured to introduce ammonia upstream of the SCR article.

In some embodiments, the vehicle on-board system is configured to introduce hydrogen into an exhaust gas stream, wherein the exhaust gas stream is at a temperature of ≤150° C.

In some embodiments is provided a vehicle comprising the vehicle on-board system as described herein.

In another aspect is provided a method for on-board vehicle generation of hydrogen, the method comprising analytically decomposing ammonia to generate hydrogen.

In some embodiments, the method further comprises isolating ammonia from an ammonia/organic solvent solution contained in a reservoir, wherein the ammonia/organic solvent solution comprises from about 1% to about 70% ammonia by weight, based on the weight of the ammonia/organic solvent solution, and the organic solvent comprises an alkanol and/or a glycol. In some embodiments, the method comprises obtaining ammonia from an ammonia storage container.

In some embodiments, the method further comprises isolating ammonia via a phase separator. In some embodiments, the method optionally further comprises storing the isolated ammonia in an ammonia storage container. In some embodiments, the method comprises catalytically decomposing the ammonia in a catalytic reactor comprising an ammonia decomposition catalyst disposed on one or more surfaces contained within the catalytic reactor. In some embodiments, the catalytic reactor is in thermal communication with a heat exchanger, wherein the heat exchanger is optionally in thermal communication with an internal combustion engine.

In some embodiments, the catalytic reactor comprises a hydrogen separation membrane. In some embodiments, the hydrogen separation membrane comprises palladium.

In some embodiments, the method further comprises storing hydrogen in a hydrogen storage article. In some embodiments, the method further comprises introducing hydrogen intermittently on-demand into an exhaust gas stream of an internal combustion engine, wherein the exhaust gas stream is at a temperature of ≤180° C. In some embodiments, the method further optionally comprises introducing ammonia into the exhaust gas stream of the internal combustion engine.

The present disclosure includes, without limitation, the following embodiments.

Embodiment 1: A vehicle on-board system comprising an ammonia source and a catalytic reactor in fluid communication with the ammonia source and configured to decompose ammonia from the ammonia source to generate hydrogen.

Embodiment 2: The vehicle on-board system of the preceding embodiment, wherein the ammonia source comprises a tank configured to store and release ammonia.

Embodiment 3: The vehicle on-board system of any preceding embodiment, wherein the ammonia source comprises a reservoir composing an ammonia organic solvent solution.

Embodiment 4: The vehicle on-board system of any preceding embodiment, wherein the ammonia/organic solvent solution comprises from about 1% to about 70% ammonia by weight, based on the weight of the ammonia/organic solvent solution, and wherein the organic solvent comprises an alkanol and/or a glycol.

Embodiment 5: The vehicle on-board system of any preceding embodiment, wherein the organic solvent comprises a solvent selected from the group consisting of ethanol, n-propanol, n-butanol n-pentanol, n-hexanol, n-heptanol, n-octanol, ethylene glycol, propylene glycol, isomers thereof and mixtures thereof.

Embodiment 6: The vehicle on-board system of any preceding embodiment, wherein the organic solvent comprises n-butanol and or ethylene glycol.

Embodiment 7: The vehicle on-board system of any preceding embodiment, wherein the ammonia/organic solvent solution comprises from about 1%, about 2%, about 3%, about 4%, about 5%, about 6%, about 7%, about 8%, about 9%, about 10%, about 11%, about 12%, or about 13%, to about 14%, about 15%, about 16%, about 17%, about 18%, about 19%, about 20%, about 21%, about 22%, about 23%, about 24%, about 25%, about 30%, about 35%, about 40%, about 45%, about 50%, about 55%, about 60%, about 65% or about 70% ammonia by weight, based on the w eight of the ammonia/organic solvent solution.

Embodiment 8: The vehicle on-board system of any preceding embodiment, further comprising a phase separator configured to isolate ammonia from the ammonia/organic solvent solution.

Embodiment 9: The vehicle on-board system of any preceding embodiment, further comprising an ammonia storage container associated with the phase separator.

Embodiment 10: The vehicle on-board system of any preceding embodiment, wherein the phase separator is in thermal communication with a heat exchanger; wherein the heat exchanger is optionally in thermal communication with an internal combustion engine.

Embodiment 11: The vehicle on-board system of any preceding embodiment, wherein the catalytic reactor comprises an ammonia decomposition catalyst disposed on one or more surfaces contained within the catalytic reactor.

Embodiment 12: The vehicle on-board system of any preceding embodiment, wherein the catalytic reactor further comprises a hydrogen separation membrane.

Embodiment 13: The vehicle on-board system of any preceding embodiment, wherein the hydrogen separation membrane comprises palladium.

Embodiment 14: The vehicle on-board system of any preceding embodiment, wherein the membrane is ≤1.0 mm thick.

Embodiment 15: The vehicle on-board system of any preceding embodiment, wherein the membrane is ≤0.1 mm thick.

Embodiment 16: The vehicle on-board system of any preceding embodiment, wherein the membrane is from about 0.001 mm to about 1 mm, from about 0.001 mm to about 0.5 mm, from about 0.001 mm about 0.2 mm, from 0.001 mm to about 0.1 mm, 0.001 mm to about 0.01 mm, from about 0.01 mm to about 1 mm, from about 0.01 mm to about 0.5 mm, from about 0.01 mm to about 0.2 mm, from about 0.01 mm to about 0.1 mm, from about 0.1 mm to about 1 mm, from about 0.1 mm to about 0.5 mm, or from about 0.1 mm to about 0.2 mm thick.

Embodiment 17: The vehicle on-board system of any preceding embodiment, wherein the membrane is supported with a perforated stainless steel sheet or ceramic sheet.

Embodiment 18: The vehicle on-board system of any preceding embodiment, wherein the perforated stainless steel sheet or ceramic sheet is from about 0.25 mm thick to about 1.5 mm thick.

Embodiment 19: The vehicle on-board system of any preceding embodiment, wherein the perforated stainless Steel sheet or ceramic sheet is about 1 mm thick.

Embodiment 20: The vehicle on-board system of any preceding embodiment, further comprising a hydrogen storage article.

Embodiment 21: The vehicle on-board system of any preceding embodiment, wherein the hydrogen storage article is configured to store gaseous hydrogen.

Embodiment 22: The vehicle on-board system of any preceding embodiment, wherein the hydrogen storage article is configured to store hydrogen in a solid state.

Embodiment 22: The vehicle on-board system of any preceding embodiment, w herein the hydrogen storage article comprises silicon or a hydrogen storage alloy.

Embodiment 23: The vehicle on-board system of any preceding embodiment, further comprising a hydrogen injection ankle configured to introduce hydrogen intermittently on-demand into an exhaust gas stream of an internal combustion engine.

Embodiment 24: The vehicle on-board system of any preceding embodiment, wherein the hydrogen injection article comprises a check valve.

Embodiment 25: The vehicle on-board system of any preceding embodiment, wherein the hydrogen injection article is in fluid communication with an oxidation catalyst and configured to introduce hydrogen upstream of the oxidation catalyst.

Embodiment 26: The vehicle on-board system of any preceding embodiment, wherein the oxidation catalyst is a diesel oxidation catalyst (DOC).

Embodiment 27: The vehicle on-board system of any preceding embodiment, wherein the hydrogen injection article is downstream of and in fluid communication with an internal combustion engine.

Embodiment 28: The vehicle on-board system of any preceding embodiment further comprising an ammonia storage container, wherein, optionally, the ammonia storage container is associated with a phase separator.

Embodiment 29: The vehicle on-board system of any preceding embodiment, further comprising an ammonia injection article, wherein the ammonia injection article is in fluid communication with a selective catalytic reduction (SCR) article and configured to introduce ammonia upstream of the SCR article.

Embodiment 30: The vehicle on-board system of preceding embodiment, integrated with a vehicle electronic management system.

Embodiment 31: The vehicle on-board system of any preceding embodiment, configured to introduce hydrogen into an exhaust gas stream at a temperature of ≤150° C.

Embodiment 32: The vehicle on-board system of any preceding embodiment, wherein the exhaust gas stream temperature is from about 0° C., about 10° C., about 20° C., about 30° C., about 40° C., about 50° C., about 60° C., about 70° C., or about 80° C., to about 90° C., about 100° C., about 110° C., about 120° C., about 130° C., about 140° C., or about 150° C.

Embodiment 33: A vehicle comprising the vehicle on-board system of any of the preceding embodiments.

Embodiment 34: A method for on-board vehicle generation of hydrogen, the method comprising analytically decomposing ammonia to generate hydrogen.

Embodiment 35: The method of any preceding embodiment, further comprising isolating ammonia from an ammonia/organic solvent solution contained in a reservoir or obtaining ammonia from an ammonia storage container, wherein the ammonia/organic solvent solution comprises from about 1% to about 70% ammonia by weight, based on the weight of the ammonia/organic solvent solution, and the organic solvent comprises an alkanol and or a glycol.

Embodiment 36: The method of any preceding embodiment, wherein the organic solvent comprises a solvent selected from the group consisting of ethanol, n-propanol, n-butanol, n-pentanol, n-hexanol, n-heptanol, n-octanol, ethylene glycol, propylene glycol, isomers thereof and mixtures thereof.

Embodiment 37: The method of any preceding embodiment, wherein the organic solvent comprises n-butanol and or ethylene glycol.

Embodiment 38: The method of any preceding embodiment, wherein the solution comprises from about 1%, about 2%, about 3%, about 4%, about 5%, about 6%, about 7%, about 8%, about 9%, about 10%, about 11%, about 12%, or about 13%, to about 14%, about 15%, about 16%, about 17% about 18%, about 19%, about 20%, about 21%, about 22%, about 23%, about 24%, about 25%, about 30%, about 35%, about 40%, about 45%, about 50%, about 55%, about 60%, about 65% or about 70% ammonia by weight, based on the weight of the ammonia/organic solvent solution.

Embodiment 39: The method of any preceding embodiment, further comprising isolating ammonia via a phase separator.

Embodiment 40: The method of any preceding embodiment, wherein the phase separator is in thermal communication with a heat exchanger.

Embodiment 41: The method of any preceding embodiment, wherein the phase separator is associated with a reservoir containing an ammoniaorganic solvent solution.

Embodiment 42: The method of any preceding embodiment, further comprising storing the isolated ammonia in an ammonia storage container.

Embodiment 43: The method of any preceding embodiment, wherein the ammonia storage container is associated with a phase separator.

Embodiment 44: The method of any preceding embodiment, wherein catalytically decomposing the ammonia is performed in a catalytic reactor comprising an ammonia decomposition catalyst disposed on one or more surfaces contained within the catalytic reactor.

Embodiment 45: The method of any preceding embodiment, wherein the catalytic reactor is associated with a phase separator.

Embodiment 46: The method of any preceding embodiment, wherein the catalytic reactor is in thermal communication with a heat exchanger, and wherein the heat exchanger is optionally in thermal communication with an internal combustion engine.

Embodiment 47: The method of any preceding embodiment, wherein the catalytic reactor comprises a hydrogen separation membrane.

Embodiment 48: The method of any preceding embodiment wherein the hydrogen separation membrane comprises palladium.

Embodiment 49: The method of any preceding embodiment, wherein the membrane is ≤1.0 mm thick.

Embodiment 50: The method of any preceding embodiment, wherein the membrane is from about 0.001 mm to about 1 mm thick.

Embodiment 51: The method of any preceding embodiment, wherein the membrane is supported with a perforated stainless steel sheet or ceramic.

Embodiment 52: The method of any preceding, embodiment, wherein the stainless steel or ceramic sheet is from about 0.25 mm thick to about 1.5 mm thick.

Embodiment 53: The method of any preceding embodiment, wherein the stainless steel or ceramic sheet is about 1 mm thick.

Embodiment 54: The method of any preceding embodiment, further comprising storing hydrogen in a hydrogen storage article.

Embodiment 55: The method of any preceding embodiment, comprising storing gaseous hydrogen.

Embodiment 56: The method of any preceding embodiment, comprising storing hydrogen in a solid state.

Embodiment 57: The method of any preceding embodiment, wherein hydrogen is stored in silicon or a hydrogen storage alloy.

Embodiment 58: The method of any preceding embodiment, further composing introducing hydrogen into an exhaust gas stream of an internal combustion engine.

Embodiment 59: The method of any preceding embodiment, comprising introducing hydrogen intermittently on-demand into an exhaust gas stream of an internal combustion engine.

Embodiment 60: The method of any preceding embodiment, comprising introducing hydrogen into an exhaust gas stream of an internal combustion engine with a cheek valve.

Embodiment 61: The method of any preceding embodiment, comprising introducing hydrogen into an exhaust gas stream of an internal combustion engine upstream of an oxidation catalyst.

Embodiment 62: The method of any preceding embodiment, wherein the oxidation catalyst is a diesel oxidation catalyst (DOC).

Embodiment 63: The method of any preceding embodiment, comprising introducing hydrogen into an exhaust gas stream of an internal combustion engine downstream of the internal combustion engine.

Embodiment 64: The method of any preceding embodiment, further comprising introducing ammonia into an exhaust gas stream of an internal combustion engine.

Embodiment 65: The method of any preceding embodiment, wherein the ammonia is introduced into an exhaust gas stream of an internal combustion engine upstream of a SCR article.

Embodiment 66: The method of any preceding embodiment, the method further comprising generating hydrogen upon instructions from a vehicle electronic management system.

Embodiment 67: The method of any preceding embodiment, the method further comprising introducing hydrogen into an exhaust gas stream of an internal combustion engine at a temperature of ≤180° C.

Embodiment 68: The method of any preceding embodiment, the method further comprising introducing hydrogen intermittently on-demand into an exhaust gas stream of an internal combustion engine wherein the exhaust gas stream is at a temperature of ≤180° C. and, optionally, introducing ammonia into the exhaust gas stream of the internal combustion engine.

Embodiment 69: The method of embodiment 68, wherein the exhaust gas stream temperature is from about 0° C., about 10° C., about 20° C., about 30° C., about 40° C., about 50° C., about 60° C., about 70° C., or about 80° C., to about 90° C., about 100° C., about 110° C., about 120° C., about 130° C., about 140° C., about 150° C., about 160° C., about 170° C., or about 180° C.

Embodiment 70: A method of treating an exhaust gas stream of an internal combustion engine, the method comprising: receiving the exhaust gas stream into an emission control system that includes on SCR catalyst unit; generating ammonia in an ammonia generation system, the ammonia generation system comprising a reservoir containing an ammonia/organic solvent solution, a phase separator configured to isolate ammonia from the ammonia/organic solvent solution, and an ammonia injection article positioned to introduce ammonia into the exhaust gas stream upstream of the SCR catalyst unit, generating gaseous ammonia by isolating ammonia from the ammonia organic solvent solution, and introducing the gaseous ammonia into the exhaust gas stream through the ammonia injection article such that the gaseous ammonia disperses within the exhaust gas stream upstream of the SCR catalyst unit.

Embodiment 71: The method of any preceding embodiment, wherein the gaseous ammonia is stored in a tank upstream of the ammonia injection article.

Embodiment 72: The vehicle on-board system of any preceding embodiment, further comprising one or more controllers adapted to monitor and control heating of the ammonia/organic solvent solution to produce gaseous ammonia, and to monitor and control the amount of ammonia injected into the exhaust gas stream by the ammonia injector.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

FIGS. 4A, 4B and 4C illustrate various coating configurations on the walls of a substrate;

FIG. 8 is a graphical comparison of engine out CO emissions between the vehicle trace and simulator; and FIG. 9 is a graphical comparison of $NO_2/NO_x$ ratio vs. inlet temperature for test of Example 3.

DETAILED DESCRIPTION OF THE INVENTION

Figure 1A:
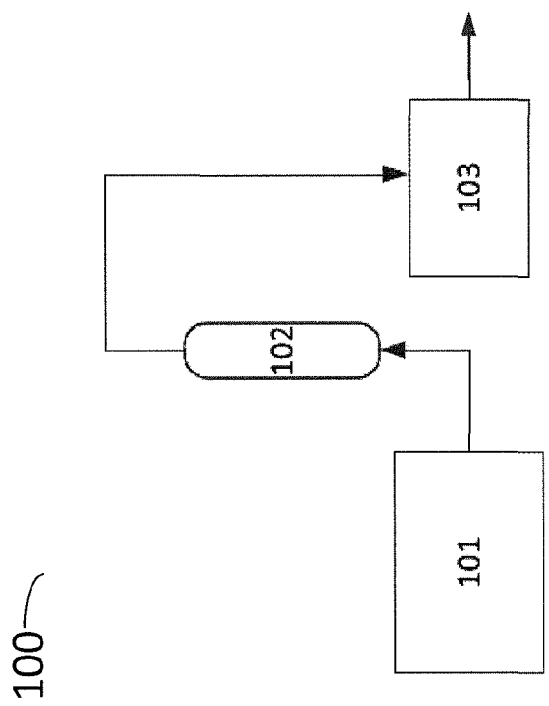
FIG. 1A is a schematic depiction of an embodiment of a vehicle on-board system to generate ammonia according to the present disclosure.

The present invention is aimed at an on-board vehicle ammonia generation system. Ammonia will advantageously be employed as a reductant in catalytic processes, for example selective catalytic reduction (SCR) processes. Ammonia may also be employed as a source of hydrogen via catalytic decomposition into hydrogen, that is, a reverse Haber-Bosch process. Generated hydrogen may serve to aid oxidation of CO and/or HC and/or $NO_2/NO_x$ formation in an exhaust gas stream, especially during a cold-start period. Hydrogen reductant is, for example, suitable to regenerate precious metals, for instance previous metals present in a diesel oxidation catalyst (DOC). Further, hydrogen reductant may minimize nitrate formation which inhibits the precious metals from dissociating the molecular oxygen needed for low temperature oxidation.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

The present invention is directed to systems, articles and methods for on-board vehicle ammonia generation for use as a reductant in an exhaust gas stream of an internal combustion engine. The invention is also aimed at systems, articles and methods for on-board hydrogen generation from ammonia. Present systems comprise one or more "functional articles" or simply "articles". Functional articles comprise one or more certain functional elements, for instance reservoirs, tubing, pumps, valves, batteries, circuitry, meters, nozzles, reactors, filters, funnels and the like. The systems are integrated, that is, having interconnected articles and or elements.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

The term "catalyst" refers to a material that promotes a chemical reaction. The catalyst includes the "catalytically active species" and the "carrier" that carries or supports the active species. For example, molecular sieves including zeolites are carriers/supports for copper active catalytic species. Likewise, refractory metal oxide particles may be a carrier for platinum group metal catalytic species.

The catalytically active species are also termed "promoters" as they promote chemical reactions. For instance, the present copper- or iron-containing molecular sieves may be termed copper- or iron-promoted molecular sieves. A "promoted molecular sieve" refers to a molecular sieve to which catalytically active species are intentionally added.

The term "catalytic article" in the invention means an article comprising a substrate having a catalyst Coating composition.

The term "configured" as used in the description and claims is intended to be an open-ended term as are the terms "comprising" or "containing". The term "configured" is not meant to exclude other possible articles or elements. The term "configured" may be equivalent to "adapted".

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen.

The term "functional article" in the invention means an article comprising a substrate having a functional coating composition disposed thereon, in particular a catalyst and/or sorbent coating composition.

"Platinum group metal components" refer to platinum group metals or one of their oxides. "Rare earth metal components" refer to one or more oxides of the lanthanum series defined in the Periodic Table of Elements, including lanthanum, cerium, praseodymium and neodymium.

As used herein, the term "promoted" refers to a component that is intentionally added to the molecular sieve material, typically through ion exchange, as opposed to impurities inherent in the molecular sieve. In order to promote the selective catalytic reduction of nitrogen oxides in the presence of ammonia, in one or more embodiments, a suitable metal is independently exchanged into the molecular sieve. According to one or more embodiments, the molecular sieve is promoted with copper (Cu) and/or iron (Fe), although other catalytic metals could be used without departing from the invention, such as manganese, cobalt, nickel, cerium, platinum, palladium, rhodium or combinations thereof. Typical amounts of promoter metal include about 0.5 to about 15% by weight of the SCR catalyst material.

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" or "$NO_x$" designate the oxides of nitrogen.

The term "sorbent" refers to a material that adsorbs and/or absorbs a desired substance, in this invention a NOx and/or CO and/or HC and/or $NH_3$. Sorbents may advantageously adsorb and/or absorb (store) a substance at a certain temperature and desorb (release) the substance at a higher temperature.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. A washcoat is formed by preparing a slurry containing a specified solids content (e.g., 30-90% by weight) of catalyst in a liquid, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. The washcoat containing the metal-promoted molecular sieve of the invention can optionally comprise a binder selected from silica, alumina, titania, zirconia, ceria, or a combination thereof. The loading of the binder is about 0.1 to 10 wt. % based on the weight of the washcoat.

The term "vehicle" means for instance any vehicle having an internal combustion engine and includes for instance passenger automobiles, sport utility vehicles, minivans, vans, trucks, buses, refuse vehicles, freight trucks, construction vehicles, heavy equipment, military vehicles, farm vehicles and the like.

Unless otherwise indicated, all parts and percentages are by weight. "Weight percent (wt. %)," if not otherwise indicated, is based on an entire composition free of any volatile, that is, based on dry solids content.

The present invention now will be described more fully hereinafter. This invention may, however, be embodied in many different forms and should not be construed as limited to the embodiments set forth herein: rather, these embodiments are provided so that this disclosure will be thorough and complete, and will fully convey the scope of the invention to those skilled in the an.

Ammonia Generation System:

The present invention provides a method and system that produces ammonia for use in an emission control system, particularly an emission control system used to treat exhaust from internal combustion engines. The method and system utilize a reservoir containing an ammoma/organic solvent solution which can be mounted (for example, on a vehicle) in proximity to other emission control system components. The ammonia/organic solvent solution will, in some embodiments, readily liberate gaseous ammonia.

Generated ammonia may advantageously be injected into an exhaust gas stream of an internal combustion engine where it will suitably function as a reductant, for instance as a reductant in selective catalytic reduction (SCR) processes. In SCR processes, $NO_x$ is reduced to nitrogen. The present ammonia generation system may replace the conventional tank containing urea at about 30 to 35% by weight in water, known as diesel exhaust fluid (DEF), as currently in commercial use in SCR systems.

Injecting ammonia into an exhaust stream from an ammonia source has several potential advantages over use of conventional DEF. A urea hydrolysis step requiring temperatures >180° C. is not needed and ammonia will also not freeze out under winter conditions. Ammonia is more effective as a reductant than urea, especially for operation temperatures below 200° C. (city driving). Direct injection of ammonia can occur at temperatures below 200° C. without the difficulties associated with urea injection at such temperatures, such as urea deposition/fouling and insufficient decomposition of urea into ammonia. In addition, diesel exhaust fluid must be pressurized to about 5 bar to ensure proper penetration into an exhaust stream, whereas ammonia injection does not require the same level of pressurization. Still further, direct injection of ammonia eliminates the need for the longer mixing channels or higher degree of turbulence associated with urea injection. Since ammonia has a vaporization point of −33° C. and there is no need to decompose urea to produce the ammonia, the systems of the invention operate more efficiently in cold environments and require less heating. It is also believed that an ammonia injection system will be more easily monitored/controlled than a diesel exhaust fluid system and will yield better $NO_x$ conversion.

Advantageously, the organic solvent in the ammonia/organic solvent solution comprises an alkanol and/or a glycol, for example a solvent selected from the group consisting of ethanol, n-propanol, n-butanol, n-pentanol, n-hexanol, n-heptanol, n-octanol, ethylene glycol, propylene glycol, isomers thereof and mixtures thereof. In certain embodiments, the organic solvent comprises n-butanol and/or ethylene glycol.

The ammonia/organic solvent solution may, for example, comprise from about 1%, about 2%, about 3%, about 4%, about 5%, about 6%, about 7%, about 8%, about 9%, about 10%, about 11%, about 12% or about 13% to about 14%, about 15%, about 16%, about 17%, about 18%, about 19%, about 20%, about 21%, about 22%, about 23%, about 24%, about 25%, about 30%, about 35%, about 40%, about 45%, about 50%, about 55%, about 60%, about 65% or about 70% ammonia by weight, based on the weight of the ammonia/organic solvent solution. These concentrations are at ambient conditions of 25° C. and 1 atm of pressure.

The reservoir will advantageously be in fluid communication with a diesel oxidation catalyst (DOC) or a selective catalytic reduction (SCR) article which are in fluid communication with an internal combustion engine. The system may comprise an ammonia injection article configured to inject ammonia into an exhaust gas stream of an internal combustion engine. The reservoir may be associated with a catalytic reactor configured to catalytically decompose ammonia into hydrogen and nitrogen, more fully described below.

In some embodiments, the ammonia generation system comprises a reservoir containing an ammonia/organic solvent solution and a phase separator configured to isolate ammonia from the solution. The phase separator may operate m a similar fashion to a distillation column and is configured to isolate lower-boiling ammonia gas from higher-boiling organic solvent. The phase separator may be in thermal communication with a heat exchanger. In the context of this disclosure, two objects "in thermal communication" means that heat from one of the two objects may be used to drive a catalytic reaction in or cause gas to desorb from the other object. Thus, heat may be applied to the phase separator. Heat applied may be, for example, from about 50° C. or about 60° C. to about 70° C. and the source of heat may be, for instance, waste heat generated from the engine during operation or the heat may be applied electrically.

The system may further comprise an ammonia storage container configured to store isolated ammonia, which may simply be, for instance, a suitable tank to hold ammonia gas. In some embodiments, the ammonia storage container may further comprise a hydrophobic zeolite to store ammonia. In some embodiments, the hydrophobic zeolite is elinoptilolite. The system may further comprise an ammonia injection article configured to introduce ammonia into an exhaust gas stream of an internal combustion engine. In some embodiments, the ammonia injection article comprises a check valve. The ammonia injection article may be configured to introduce ammonia into the exhaust gas stream intermittently on-demand.

The ammonia injection article may suitably be in fluid communication with a SCR article and configured to inject ammonia upstream of the SCR article. The ammonia injection article may suitably be in fluid communication with an internal combustion engine. The SCR article is adapted to reduce $NO_x$.

The system may be configured so that as ammonia is isolated, the organic solvent is also removed so as to keep the ammonia concentration m the ammonia organic solvent solution relatively constant. Removed organic solvent may be routed to a fuel supply or fuel feed stream or a combustion chamber of an engine and employed as a fuel. The phrase "combine organic solvent with fuel" encompasses these variations.

The ammonia generation system may advantageously comprise a reservoir containing an ammonia/organic solvent solution; a phase separator configured to isolate ammonia from the solution; an ammonia storage container and an ammonia injection article. The system is integrated with the articles and elements associated with each other.

An exemplary system 100 is shown in FIG. 1A. Reservoir 101 is configured to contain an ammonia/organic solvent solution. Ammonia may be directed to a phase separator 102 configured to isolate ammonia from the ammonia/organic solvent solution. Isolated ammonia may be directed to an ammonia storage container 103. One or more ankles may be associated with a heat exchanger, for example reservoir 101 and/or phase separator 102, which heat exchanger(s) may be associated with waste heat from an engine.

Hydrogen Generation System

The ammonia generation system of the invention is optionally combined with a catalytic reactor configured to catalytically decompose ammonia into hydrogen and nitrogen, more fully described below. Generated hydrogen may advantageously be injected into an exhaust gas stream of cm internal combustion engine, where it will suitably function as a reductant in certain catalytic processes and/or catalyst regeneration processes. Catalytic processes include oxidation of CO and/or HC and/or $NO_x$ pollutants.

Figure 1B:
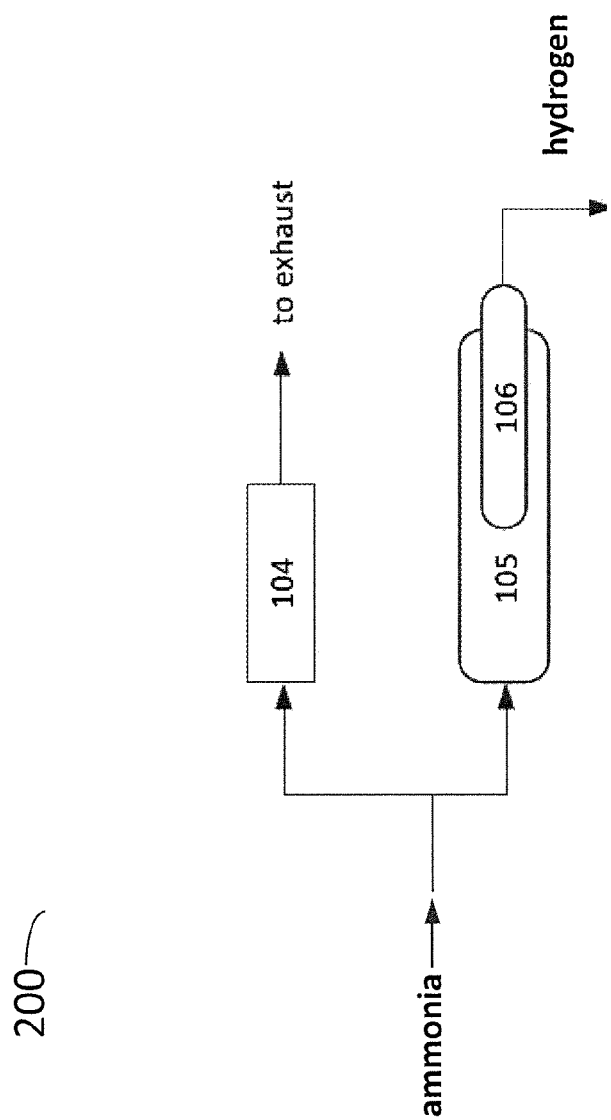
FIG. 1B is a schematic depiction of an embodiment of a vehicle on-board system to generate hydrogen according to the present disclosure.

An exemplary on-board hydrogen generation system is configured to generate hydrogen via catalytic decomposition of ammonia and comprises a catalytic reactor configured to decompose ammonia to hydrogen and nitrogen, as shown in FIG. 1B. In system 200, ammonia may be directed to a SCR article 104, for use as a reductant, and/or may be directed to a catalytic reactor 105. In one embodiment, ammonia may be directed to a catalytic reactor 105, configured to decompose ammonia into hydrogen and nitrogen, thereby generating hydrogen for further catalytic reactions. Catalytic reactor 105 may contain an ammonia decomposition catalyst disposed on one or more internal surfaces contained in catalytic reactor 105, which may be an inner surface of catalytic reactor 105 thereof and/or on high surface area supports present within the reactor volume of catalytic reactor 105. The catalytic reactor 105 may comprise a hydrogen separation membrane 106, which membrane may comprise a catalytic coating composition comprising an ammonia decomposition catalyst disposed on an outer surface of the membrane. The membrane is configured so that ammonia contacts the outer surface containing the decomposition catalyst. Ammonia decomposition catalysts include, for example, precious metals on silica, for example supported ruthenium. One or more articles may be associated with a heat exchanger, for example, catalytic reactor 105, which heat exchanger(s) may be associated with waste heat from an engine. Not shown are any necessary check valves, a hydrogen injector or an ammonia injector.

The source of ammonia may be from the present on-board ammonia reservoir or may be from ammonia brought onboard, for example in a tank adapted to contain gaseous or liquid ammonia (and adapted to release ammonia as needed). For instance, the system may comprise a tank adapted to contain ammonia and release ammonia (ammonia storage tank) and a catalytic reactor configured to decompose ammonia into hydrogen and nitrogen. For example, the system comprises a reservoir containing an ammonia/organk solvent solution and a catalytic reactor configured to decompose ammonia to hydrogen and nitrogen. The hydrogen generation system may, in some embodiments, comprise the articles and elements of the ammonia generation system described above. The catalytic reactor may be termed an "ammonia decomposition article."

The hydrogen generation system may comprise a phase separator and/or an ammonia storage container integrated with the reservoir and with the catalytic reactor.

The catalytic reactor may comprise an ammonia decomposition catalyst disposed on an inner surface thereof and/or onto high surface area supports which may be present within the volume of the reactor. The catalytic reactor may comprise a heat exchanger configured to provide waste heat generated from the internal combustion engine to the catalyst (to heat the catalyst). The ammonia decomposition catalyst may also be heated through the combustion of a fixed amount of ammonia and air.

For instance, the catalytic reactor may contain a coating composition comprising an ammonia decomposition catalyst disposed on an inner surface thereof and/or on a high surface area support present within the volume thereof. The catalytic reactor may advantageously be associated with a heat exchanger where for example the heat exchanger is associated with an internal combustion engine and adapted to provide waste heat from the engine to the reactor to heat the decomposition catalyst. Alternatively, the decomposition catalyst may be heated if desired through combustion of a fixed amount of ammonia and air.

Ammonia decomposition catalysts include, for example, precious metals on silica, for example, supported ruthenium.

Hydrogen separation membranes may comprise palladium or palladium alloys and may for instance be ≤1.0 mm thick. Hydrogen separation membranes nay also comprise for example polymer, silica, ceramic or porous carbon. For example, the membrane is ≤0.1 mm thick, for example the membrane is from about 0.001 mm, from about 0.01 or from about 0.1 mm thick to about 0.2, about 0.5 or about 1 mm thick. The membrane may be supported with a perforated stainless steel sheet, for instance about 1 mm thick. Alternatively, the membrane may be supported on a porous ceramic tube or rod. The membrane may be associated with a heating element, e.g. an electrical heating element, to maximize the flow of hydrogen and separation from oxygen.

The hydrogen generation system may comprise a hydrogen storage article, which for instance may be configured to store hydrogen in a gaseous, liquid or solid state. Hydrogen may, for example, be stored in a gas storage tank or reservoir. Hydrogen may be stored for instance in a solid state, far example in silicon or a hydrogen storage alloy. Silicon includes porous silicon. Solid state hydrogen storage is taught for example in U.S. Pre-Grant Publication Nos. 2004/0241507, 2008/0003470, 2008/0274873, 2010/0024542 and 2011/0236790, which are incorporated herein by reference in their entirety. Hydrogen storage alloys reversibly store hydrogen and are disclosed for example in U.S. Pat. Nos. 5,407,761 and 6,193,929 and U.S. Pub. No. 2016/0230255, which are incorporated herein by reference in their entirely. Hydrogen storage alloys are, for example, modified $AB_x$ type metal hydride (MH) alloy's where in general, A is a hydride forming element and B is a weak or non-hydride forming element. A is in general a larger metallic atom with 4 or less valence electrons and B is in general a smaller metallic atom with 5 or more valence electrons. Suitable $AB_x$ alloys include those where x is from about 0.5 to about 5. The present alloys are capable of reversibly absorbing (charging) and desorbing (discharging) hydrogen. $AB_x$ type alloys are for example of the categories (with simple examples). AB (HfNi, TiFe, $TiNi)_x$, $AB_2$ ($ZrMn_2$, $TiFe_2$), $A_2B$ ($Hf_2Fe$, $Mg_2Ni$), $AB_3(NdCo_3, GdFe_3)$, $A_2B_3(Pr_2Ni_7, Ce_2Co_7)$ and $AB_5(LaNi_5, CeNi_3)$.

The hydrogen generation article will advantageously contain a hydrogen injection article configured to introduce (e.g., inject or release) hydrogen into an exhaust gas stream of an internal combustion engine. The hydrogen injection article may be configured to introduce hydrogen intermittently on-demand. In some embodiments, the hydrogen injection article comprises a check valve.

The hydrogen injection article may be in fluid communication with an oxidation catalyst and configured to introduce hydrogen upstream of the oxidation catalyst, for example a diesel oxidation catalyst (DOC). The hydrogen injection article will typically be downstream of and in fluid communication with an internal combustion engine.

A present system may comprise both ammonia injection and hydrogen injection articles and thus be configured to introduce both ammonia and hydrogen. For example, ammonia may be introduced upstream of a Selective Catalytic Reduction (SCR) catalytic article and hydrogen may be introduced upstream of an oxidation catalytic article.

Figure 1C:
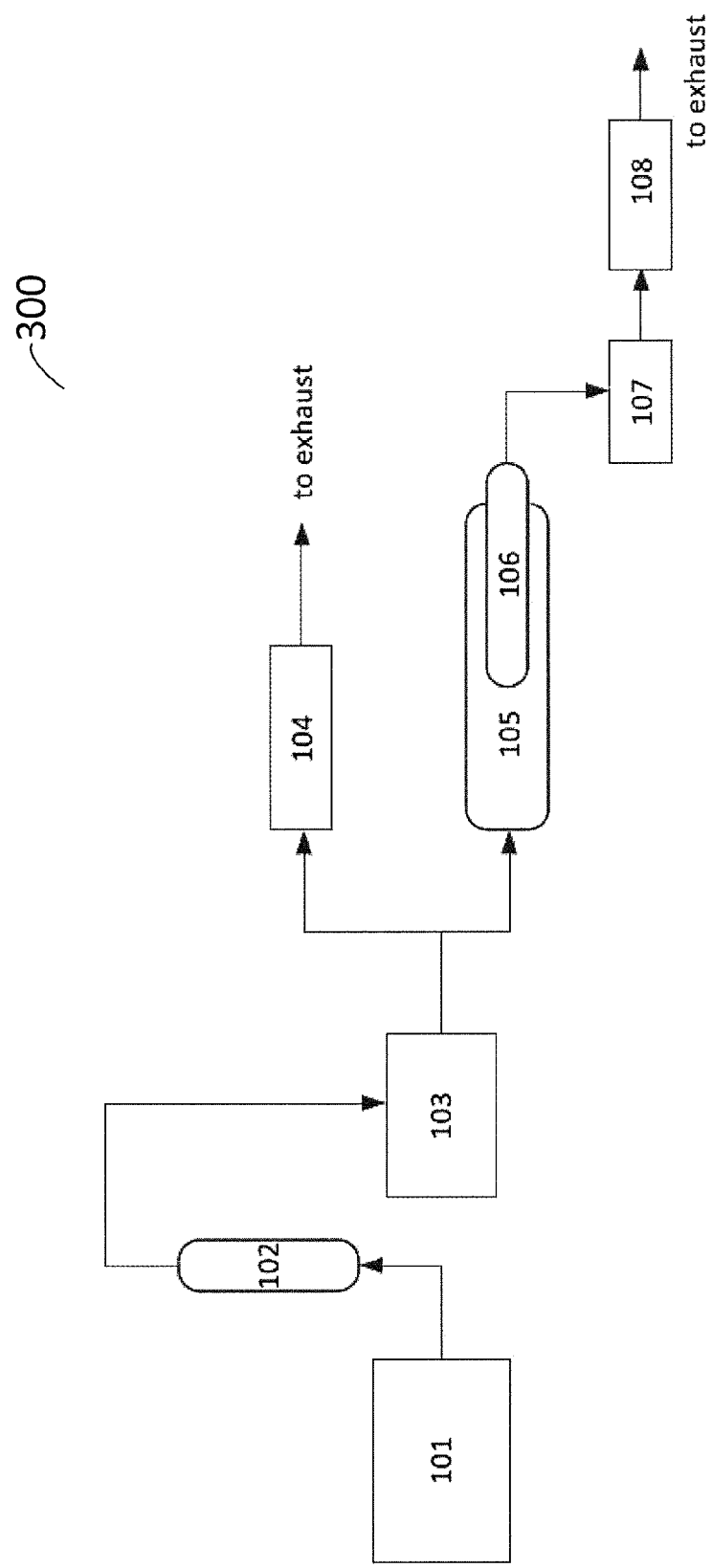
FIG. 1C is a schematic depiction of an embodiment of a vehicle on-board system to generate ammonia and or hydrogen according to the present disclosure.

A possible system 300 according to the present disclosure for generating ammonia and hydrogen for use in an emission control system is shown schematically in FIG. 1C. System 300 incorporates the features of ammonia generation system 100 and hydrogen generation system 200, as shown if FIGS. 1A and 1B and described herein above. In one embodiment, ammonia may be directed to a catalytic reactor 105, configured to decompose ammonia into hydrogen and nitrogen. Catalytic reactor 105 may contain an ammonia decomposition catalyst disposed on an inner surface thereof and/or on high surface area supports present within the reactor volume. The catalytic reactor 105 may comprise a hydrogen separation membrane 106, which membrane may comprise a catalytic coating composition comprising an ammonia decomposition catalyst disposed on an inner surface of the membrane. The membrane is configured so that ammonia contacts the inner surface containing the decomposition catalyst. Ammonia decomposition catalysts include for example precious metals on silica, for example supported ruthenium.

The catalytic reactor may be vented to release generated nitrogen. The membrane may serve to isolate hydrogen, which may be directed to a hydrogen storage article 107. Isolated hydrogen may be directed to a DOC article 108. One or more articles may be associated with a heat exchanger, for example reservoir 101 and/or phase separator 102 and/or catalytic reactor 105, which heat exchanger(s) may be associated with waste heat from an engine. Not shown are any necessary check valves, a hydrogen injector or an ammonia injector.

The present system may suitably contain one or more hydrogen injection articles, for instance a check valve, configured to introduce hydrogen into an exhaust gas stream. Hydrogen will advantageously be "pulsed" or released intermittently into the exhaust gas stream to perform a desired reducing function upon demand (on-demand).

As mentioned, catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components m the exhaust.

Catalyst compositions employed in the SC R process ideally should be able to retain good catalytic activity over the wide range of temperature conditions of use, for example, about 200° C. to about 600° C. or higher, under hydrothermal conditions. In one embodiment, the SCR catalyst is a molecular sieve promoted with a catalytic metal or is a mixed oxide SCR catalyst.

As used herein, the term "mixed oxide" refers to an oxide that contains cations of more than one chemical element or cations of a single element in several states of oxidation. In one or more embodiments, the mixed oxide is selected from Fe/titania (e.g., $FeO_x/TiO_2$), Fe/alumnia (e.g., $FeO_x/Al_2O_3$), Mg/titania (e.g., $MgO/TiO_2$), Mg/alumina (e.g., $MgO_x$, $Al_2O_3$), Mn/alumina, Mn/titania (e.g., $MnO_x/TiO_2$) (e.g., $MnO_x/Al_2O_3$), Cu/titania (e.g., $CoO_x/TiO_3$), Ce/Zr (e.g., $CeO_x/ZrO_x$), Ti/Zr (e.g., $TiO_x/ZrO_2$), vanadia/titania (e.g., $V_2O_x/TiO_2$), and mixtures thereof. In specific embodiments, the mixed oxide comprises vanadia/titania. The vanadia/titania oxide can be activated or stabilized with tungsten (e.g., $WO_3$) to provide $V_2O_x/TiO_2/WO_3$. In one or more embodiments, the SCR catalyst composition comprises titania in which vanadia has been dispersed. The vanadia can be dispersed at concentrations ranging from 1 to 10 wt. %, including 1, 2, 3, 4, 5, 6, 7, 8, 9, 10 wt. %. In specific embodiments the vanadia is activated or stabilized by tungsten ($WO_x$). The tungsten can be dispersed at concentrations ranging from 0.5 to 10 wt. %, including 1, 2, 3, 3, 4, 5, 6, 7, 8, 9, and 10 wt. %. All percentages are on an oxide basis. Examples of mixed oxide SCR catalysts, particularly titania/vanadia SCR catalysts, are set forth in US2001/0049339 to Schafer-Sindlinger et al., which is incorporated by reference herein in its entirety.

The term "molecular sieve" refer to framework materials such as zeolites and other framework materials (e.g., isomorphously substituted materials). Molecular sieves are materials based on an extensive three-dimensional network of oxygen ions containing generally tetrahedral type sites and having a substantially uniform pore distribution, with the average pore size being no larger than 20 Å. The pure sizes are defined by the ring size. According to one or more embodiments, it will be appreciated that by defining the molecular sieves by their framework type, it is intended to include any and all zeolite or isotypic framework materials, such as SAPO, AlPO and MeAlPO, Ge-silicates, all-silica, and similar materials having the same framework type.

Generally, molecular sieves, e.g., zeolites, are defined as aluminosilicates with open 3-dimensional framework structures composed of corner-sharing $TO_x$ tetrahedral, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

Aluminosilicate zeolite structures do not include phosphorus or other metals isomorphically substituted in the framework. That is, "aluminosilicate zeolite" excludes aluminosilicate materials such as SAPO, AlPO and MeAlPO materials, while the broader term "zeolite" includes aluminosilicates and aluminophosphates for the purposes this disclosure, SAPO, AlPO and MeAlPO materials are considered non-zeolitic molecular sieves.

In more specific embodiments, reference to an aluminosilicate zeolite framework type limits the material to molecular sieves that do not include phosphorus or other metals substituted in the framework. The term "aluminophosphates" refers to another specific example of a molecular sieve, including aluminum and phosphate atoms. Aluminophosphates are crystalline materials having rather uniform pore sizes.

In one or more embodiments, the molecular sieve, independently, comprises $SiO_x/AlO_x$ tetrahedral that are linked by common oxygen atoms to form a three-dimensional network. In other embodiments, the molecular sieve comprises $SiO_x/AlO_x/PO_x$ tetrahedral. The molecular sieve of one or more embodiments can be differentiated mainly according to the geometry of the voids which are formed by the rigid network of the $(SiO_x)/AlO_x$, or $SiO_x/AlO_x/PO_x$, tetrahedral. The entrances to the voids are formed from 6, 8, 10, or 12 ring atoms with respect to the atoms which form the entrance opening.

According to one or more embodiments, the molecular sieve can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVI, AWO, AWW, BCT, BEA, BEC, BIK, BOG, BPH, BRE, CAN, CAS, SCO, CFI, SGF, CCS, CHA, CHI, CLO, CON, CZP, DAC, DDR, DFO, DFT, DOH, DON, FAB, EDI, EEI, EMT, EON. EPI, ERI, ESV, ETR, EUO, FAU, FER, FRA, CIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ. MEI, MEL, MEP, MER, MFI, MFS. MON, MOR, MOZ, MSO, MTF, MTN, MTT, MTW, MWF, MWW, NAB, NAT, NES, NON, NPO, NPT, NSI, QBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

Molecular sieves can be zeolitic (zeolites) or may be non-zeolitic. As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 to 10 Ångstroms in diameter. The molar ratio of silica to alumina ("silica-to-alumina ratio" or "SAR") of zeolites, as well as other molecular sieves, can vary over a wide range, but is generally 2 or greater. For instance, present molecular sieves may have an SAR of from about 5 to about 250, from about 10 to about 200, from about 2 to about 300, from about 5 to about 250, from about 10 to about 200, from about 10 to about 100, from about 10 to about 75, from about 10 to about 60, from about 10 to about 50, from about 15 to about 100, from about 15 to about 75, from about 15 to about 60, from about 15 to about 50, from about 20 to about 100, from about 20 to about 75, from about 20 to about 60 or from about 20 to about 50. In one or more embodiments, the molecular sieve has an SAR molar ratio in the range of about 2 to about 300, including about 5 to about 250; about 5 to about 200; about 5 to about 100; and about 5 to about 50. In one or more specific embodiments, the molecular sieve has an SAR molar ratio in the range of about 10 to about 200, about 10 to about 100, about 10 to about 75, about 10 to about 60, and about 10 to about 50; about 15 to about 100, about 15 to about 75, about 15 to about 60, and about 15 to about 50; about 20 to about 100, about 20 to about 75, about 20 to about 60, and about 20 to about 50. In one or more embodiments, the molecular sieve has an SAR molar ratio in the range of about 1, about 2, about 5, about 8, about 10, about 15, about 20 or about 25 to about 30, about 35, about 40, about 45, about 50, about 60, about 70, about 80 about 90, about 100, about 150, about 200, about 260, about 300, about 400, about 500, about 750 or about 1000.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Exemplary zeolitic framework types used in certain embodiments include AEI, AFT, AFX, AFV, AVL, CHA, DDR, EAB, EEI, EMT, ERI, FAU, GME, IFY, IRn, JSR, KFI, LEV, LTA, LTL, LTN, MER, MOZ, MSO, MWF, MWW, NPT, OFF, PAU, RHO, RTE, RTH, SAS, SAT, SAV, SBS, SBT, SFW, SSF, SZR, TSC, UFI, and WEN. In certain advantageous embodiments, the zeolitic framework is selected from AEI, AFT, AFV, AFX, AVL, CHA, DDR, EAB, EEI, ERI, IFY, IRN, KFl, LEV, LTA, LTN, MER, MWF, NPT, PAU, RHO, RTE, RTH, SAS, SAT, SAV, SFW, TSC, UFI, and combinations thereof. For example, molecular sieves may comprise a framework type selected from the group consisting of AEI, BEA (Beta zeolites), CHA (chabazite), FAU (zeolite Y), FER, (ferrierite), MFI (ZSM-5) and MOR (mordenite). In other specific embodiments, the molecular sieve has a framework type selected from the group consisting of CHA, AEI, AFX, ERI, KFl, LEV, and combinations thereof. In still further specific embodiments, the molecular sieve has a framework type selected from CHA, AEI, and AFX. In one or more very specific embodiments, the molecular sieve has the CHA framework type. Non-limiting examples of zeolites having the AEI, BEA, CHA, FAU, FER, MFI and MOR structures include chabazite, faujasite, zeolite Y, ultrastable zeolite Y, Beta zeolite, mordenite, silicalite, zeolite X, and ZSM-5.

Both zeolitic and non-zeolitic molecular sieves can have the chabazite crystal structure, which is also referred to as the CHA structure by the International Zeolite Association. Zeolitic CHA-framework type molecular sieves include a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et. Al.: Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538. Synthesis of a synthetic form of a non-zeolitic molecular sieve having the chabazite crystal structure, silicoaluminophosphate 34 (SAPO-34), is described in U.S. Pat. Nos. 4,440,871 and 7,264,789, each of which is hereby incorporated by reference. A method of making yet another synthetic non-zeolitic molecular sieve having chabazite structure, SAPO-44, is described for instance in U.S. Pat No. 6,162,415, which is hereby incorporated by reference.

Reference to a "non-zeolite-support" or "non-zeolitic support" in a catalyst layer refers to a material that is not a zeolite and that receives precious metals, stabilizers, promoters, binders and the like through association, dispersion, impregnation or other suitable methods. Examples of such non-zeolitic supports include, but are not limited to, high surface area refractory metal oxides. High surface area refractory metal oxide supports can comprise an activated compound selected from the group consisting of alumina, zirconia, silica, titania, ceria, lanthana, baria and combinations thereof.

Present molecular sieves comprise small pore, medium pore and large pore molecular sieves or combinations thereof. A small pore molecular sieve contains channels defined by up to eight tetrahedral atoms. As used herein, the term "small pore" refers to pore openings which are smaller than about 5 Ångstroms, for example on the order of ~3.8 Ångstroms. A medium pore molecular sieve contains channels defined by ten-membered rings. A large pore molecular sieve contains channels defined by twelve-membered rings.

In one or more embodiments, the molecular sieve comprises ring sizes of no larger than 12, including 6, 8, 10, and 12. In one or more embodiments, the molecular sieve comprises an 8-ring small pore aluminosilicate zeolite.

Small pore molecular sieves may be selected from the group consisting of framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof. For instance, the small pore molecular sieve is selected from the group of framework types CHA, LEV, AEI, AX, ERI, SFW, KFI, DDR and ITE.

Medium pore molecular sieves are selected from the group consisting of framework types AEL, AFO, AHT, BOF, BOZ, CGF, CGS, CHI, DAC, EUO, FER, HEU, IMF, ITH, ITR, JRY, JSR, JST, LAU, LVO, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof. For instance, the medium pore molecular sieves are selected from the group consisting of framework types FER, MEL, MFI and STT.

Large pore molecular sieves are selected from the group consisting of framework types AFl, AFR. AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof. For instance, the large pore molecular sieves are selected from the group consisting of framework types AFI, BEA, MAZ, MOR and OFF. In some embodiments, these molecular sieves are selected from $H^+$-forms of large pore molecular sieves such as Beta zeolite. Also suitable are base metal-containing molecular sieves including FeBeta and CuCHA. Other large pore molecular sieves are those listed above and also ZSM-12, SAPO-37, etc.

Useful molecular sieves have 8-ring pore openings and double-six ring secondary building units, for example, those having structure types AEI, AFf, AFX, CHA, EAB, ERI, KFI, LEV, SAS, SAT or SAV. Included are any and all isotopic framework materials such as SAPO. AlPO and MeAlPO materials having the same structure type.

The phrase "8-ring" zeolites refers to zeolites having 8-ring pore openings and double-six ring secondary building units and having a cage-like structure resulting from the connection of double six-ring building units by 4 rings. In one or more embodiments, the molecular sieve is a small pore molecular sieve having a maximum ring size of eight tetrahedral atoms.

The 8-ring small pore molecular sieves include aluminosilicate molecular sieves, metal-containing aluminosilicate molecular sieves, aluminophosphate (AlPO) molecular sieves, metal-containing aluminophosphate (MeAlPO) molecular sieves, silico-aluminophosphate (SAPO) molecular sieves, and metal-containing silico-aluminophosphate (MeSAPO) molecular sieves, borosilicates, gallosilicates. MeAPSOs, MeAPOs, and mixtures thereof. These include, but are not limited to SSZ-13, SSZ-62, natural chabazite, zeolite K-G, Linde D, Linde R, LZ-218, LZ-235, LZ-236, ZK-14, SAPO-34, SAPO-44, SAPO-47, ZYT-6, CuSAPO-34, CuSAPO-44 and CuSAPO47. In specific embodiments, the 8-ring small pore molecular sieve will have an aluminosilicate composition, such as SSZ-13 and SSZ-62.

In one or more embodiments, the 8-ring small pore molecular sieve has the CHA crystal structure and is selected from the group is consisting of aluminosilicate zeolite having the CHA crystal structure, SAPO, AlPO, and MeAlPO. In particular, the 8-ring small pore molecular sieve having the CHA crystal structure is an aluminosilicate zeolite having the CHA crystal structure. In a specific embodiment, the 8-ring small pore molecular sieve having the CHA crystal structure will have an aluminosilicate composition, such as SSZ-13 and SSZ-62. Copper- and iron-containing chabazite are termed CuCHA and FeCHA.

A synthetic 8-ring small pore molecular sieve (for example having the CHA structure) may be prepared via mixing a source of silica, a source of alumina and a structure directing agent under alkaline aqueous conditions. Typical silica sources include various types of fumed silica, precipitated silica and colloidal silica, as well as silicon alkoxides. Typical alumina sources include boehmites, pseudo-boehmites, aluminum hydroxides, aluminum salts such as aluminum sulfite or sodium aluminate and aluminum alkoxides. Sodium hydroxide is typically added to the reaction mixture. A typical structure directing agent for this synthesis is adamantyltrimethyl ammonium hydroxide, although other amines and/or quaternary ammonium salts may be substituted or added. The reaction mixture is heated in a pressure vessel with stirring to yield a crystalline product. Typical reaction temperatures are in the range of from about 100° C. to about 200° C., for instance from about 135° C. to about 170° C. Typical reaction times are between 1 hr and 30 days and in specific embodiments, for instance from 10 hours to 3 days. At the conclusion of the reaction, optionally the pH is adjusted to between 6 and 10, for example between 7 and 7.5 and the product is filtered and washed with water. Any acid can be used for pH adjustment, for instance nitric acid. Optionally, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences or mixtures of gases can be applied. Typical calcination temperatures are in from about 400° C. to about 850° C.

Molecular sieves having a CHA structure may be prepared for instance according to methods disclosed in U.S. Pat Nos. 4,544,538 and 6,709,644, which are incorporated herein by reference.

The molecular sieves are, for instance, porous molecular sieve particles wherein greater than 90% of the molecular sieve particles have a particle size greater than 1 μm. In some embodiments, the molecular sieve particle size has a $d_{50}$ less than 80 microns. In one or more embodiments the molecular sieve particles have a $D_{50}$ less than 80, 70, 60, 55, 50, 45, 40, 35, 30, 25, 20, 15, or 10 microns. In some embodiments, the molecular sieve particle size has a $d_{50}$ less than 50 microns. In some embodiments, greater than 95% of the molecular sieve particles. Have a particle size greater than 1 μm and in more specific embodiments, greater than 96% of the molecular sieve particles have a particle size greater than 1 μm and in even more specific embodiments, the molecular sieve particle component comprises about 96% particles greater than 1 μm and about 85% of particles greater than 2 μm, and in highly specific embodiments, the molecular sieve particle component comprises about 96% particles within 5 μm of the mean particle size and the mean particle size is greater than about 5 μm. In one or more embodiments, the molecular sieve particle component comprises 96% particles in the range of about 1 μm to 10 μm. Molecular sieves suitable for adsorption are disclosed for example in U.S. Pre-Grant Publication No. 2016/0136626 and U.S. Pat No. 9,321,042, which are incorporated herein by reference.

The present molecular sieves may exhibit a high surface area, for example a BET surface area, determined according to DIN 66131, of at least about 400 m$^2$/g, at least about 550 m$^2$/g or at least about 650 m$^2$/g, for example from about 400 to shout 750 m$^2$/g or from about 500 to about 750 m$^2$/g. The present molecular sieves may have a mean crystal size of from about 10 nanometers to about 10 microns, from about 50 nanometers to about 5 microns or from about 0.1 microns to about 0.5 microns as determined via SEM. For instance, the molecular sieve crystallites may have a crystal size greater than 0.1 microns or 1 micron and less than 5 microns.

SCR catalysts may, in some embodiments, include base metal (e.g., copper and/or iron) ion-exchanged molecular sieves (e.g., Cu—Y and Fe-beta). The present molecular sieves are, for example, copper- or iron-containing. The copper or iron resides in the ion-exchange sites (pores) of the molecular sieves and may also be associated with the molecular sieves but not "in" the pores. For example, upon calcination, non-exchanged copper salt decomposes to CuO, also referred to herein as "free copper" or "soluble copper." Free base metal may be advantageous, as disclosed in U.S. Pat. No. 8,404,203, which is incorporated herein by reference. The amount of free base metal such as copper may be less than, equal to or greater than the amount of ion-exchanged base metal.

The copper- or iron-containing molecular sieves are prepared for example via ion-exchange from for example a Na$^+$ containing molecular sieve (Na$^+$ form). The Na$^+$ form generally refers to the calcined form without any ion exchange. In this form, the molecular sieve generally contains a mixture of Na$^+$ and H$^+$ cations in the exchange sites. The fraction of sites occupied by Na$^+$ cations varies depending on the specific zeolite batch and recipe. Optionally, the alkali metal molecular sieves are NH$_3^+$-exchanged and the NH$_4^+$ form is employed for ion-exchange with copper or iron. Optionally, the NH$_4^+$-exchanged molecular sieve is calcined to the H$^+$-exchanged form, which H$^+$ form may be employed for ion-exchange with copper or iron ions.

Copper or iron is ion-exchanged into molecular sieves with alkali metal. NH$_4^+$ or H$^+$ forms with copper or iron salts such as copper acetate, copper sulfate, iron chloride, iron acetate and the like, for example as disclosed in U.S. Pat. No. 9,242,238. For instance a Na$^+$, NH$_4^+$ or H$^+$ form of a molecular sieve is mixed with an aqueous salt solution and agitated at an elevated temperature for a suitable time. The slurry is filtered and the filter cake is washed and dried.

The present molecular sieves may contain other catalytically active metals such as copper, iron, manganese, cobalt, nickel, cerium, platinum, palladium, rhodium or combinations thereof.

Further, at least a portion of a catalytically active metal may be included during a molecular sieve synthetic process such that a tailored colloid contains a structure directing agent, a silica source, an alumina source and a metal ion (e.g. copper) source.

The amount of iron in the iron-containing molecular sieve is for example from about 1.0 to about 15 wt. % and the amount of copper in the copper-contaimng molecular sieve is for example from about 0.3 to about 10.0 wt. %, based on the total weight of the iron-containing molecular sieve.

For example the amount of copper in the molecular sieve is about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0 wt. %, about 2.1, about 2.2, about 2.3, about 2.4, about 2.5, about 2.6, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4.8, about 4.9 or about 5.0 wt. %, based on the total weight of the copper-containing molecular sieve.

For example, the amount of iron in the iron-containing molecular sieve is about 3.0, about 3.5, about 4.0, about 4.5, about 5.0, about 5.5, about 6.0, about 6.5, about 7.0, about 7.5, about 8.0, about 8.5, about 9.0, about 9.5 or about 10 wt. %, based on the total weight of the molecular sieve.

Amounts of catalytic metals like copper or iron in a molecular sieve are reported as the oxide, CuO or Fe$_2$O$_3$. The total dry weight of the molecular sieve includes the any added/exchanged metals like copper or iron.

Useful 8-ring small pore molecular sieves containing copper or iron may, in some embodiments, each have a sodium content (reported as Na$_2$O on a volatile free basis) of below 2 wt. %, based on the total weight of the calcined molecular sieve. In more specific embodiments, sodium content is below 1 wt. % or below 2500 ppm. The molecular sieves may each have an atomic sodium to aluminum ratio of from about 0.02 to about 0.7. The molecular sieves may each have an atomic copper or iron to sodium ratio of from about 0.5 to about 50.

Alkali or alkaline earth metals may be incorporated into a copper-containing molecular sieve to provide additional SCR promotion. For example barium can be incorporated into a molecular sieve (e.g. CuCHA) by addition of Ba acetate before, after or in a co-exchange process with Cu.

SCR catalysts may, in some embodiments comprise, for instance, base metal (e.g., copper or iron) exchanged zeolite compositions (e.g., Cu—Y or Fe-beta) or vanadia-based compositions (e.g., V$_2$O$_3$/WO$_3$/TiO$_2$SiO$_2$). Base metal ion-exchanged zeolites are described, for example, in U.S. Pat. No. 7,998,423, which is incorporated by reference. For example, a present SCR catalyst is CuCHA, for example copper-SSZ-13. Molecular sieves exhibiting structures similar to chabazite such as SAPO are also found effective. Thus, CuSAPO, for example copper-SAPO-34 is also suitable. For example, suitable compositions may comprise a vanadia/titania catalyst and a Cu-zeolite or comprise a mixture of a Cu-containing molecular sieve and a Fe-containing molecular sieve. Suitable SCR compositions are also disclosed, for example, in U.S. Pat. Nos. 9,017,626, 9,242,238 and 9,352,307, each of which is incorporated by reference for the teachings regarding such compositions.

Copper- or iron-containing molecular sieves suitable for the present SCR catalysts may, in some embodiments, exhibit a BET surface area, determined according to DIN 66131, of at least about 400 m$^2$/g, at least about 550 m$^2$/g or at least about 650 m$^2$/g, for example from about 400 to about 750 m$^2$/g or from about 500 to about 750 m$^2$/g. The present molecular sieves may have a mean crystal size of from about 10 nanometers to about 10 microns, from about 50 nanometers to about 5 microns or from about 0.1 microns to about 0.5 microns as determined via SEM. For instance, the molecular sieve crystallites may have a crystal size greater than 0.1 microns or 1 micron and less than 5 microns.

The molecular sieves may be provided in the form of a powder or a spray-dried material is admixed with or coated with suitable modifiers. Modifiers include silica, alumina, titania, zirconia and refractory metal oxide binders (for example a zirconium precursor). The powder or the sprayed material, optionally after admixing or coating by suitable modifiers, may be formed into a slurry, for example with water, which is deposited upon a suitable substrate as disclosed, for example, in U.S. Pat. No. 8,404,203, which is incorporated herein by reference.

Oxidation Catalyst Compositions

Oxidation catalysts comprising a precious metal, such as platinum group metals (PGM), dispersed on a refractory metal oxide support, such as alumina, are known for use in treating the exhaust of diesel engines in order to convert both hydrocarbon (HC) and carbon monoxide (CO) gaseous pollutants by catalyzing the oxidation of these pollutants to carbon dioxide and water. Such catalysts have been generally contained in DOCs, which are placed in the exhaust flow path from diesel power systems to treat the exhaust before it vents to the atmosphere. Typically, the diesel oxidation catalysts are formed on ceramic or metallic substrates upon which one or more catalyst coating compositions are deposited.

Generally, an oxidation catalyst composition for use in a DOC comprises a PGM component dispersed on a support. The oxidation catalyst composition may comprise a PGM component from about 0.1 wt. % (weight percent), about 0.5 wt. %, about 1.0 wt. %, about 1.5 wt. % or about 2.0 wt. % to about 3 wt. %, about 5 wt. %, about 7 wt. %, about 9 wt. %, about 10 wt. %, about 12 wt. %, about 15 wt. %, about 16 wt. %, about 17 wt. %, about 18 wt. %, about 19 wt. % or about 20 wt. %, based on the weight of the dry composition.

The support material on which the cataiyticaliy active PGM is deposited for example comprises a refractory metal oxide, which exhibits chemical and physical stability at high temperatures, such as the temperatures associated with gasoline or diesel engine exhaust. An exemplary oxidation catalyst composition for use in a DOC comprises a PGM component dispersed on a refractory metal oxide support. Exemplary metal oxides include alumina, silica, zirconia, titania, ceria, praseodymia, tin oxide and the like, as well as physical mixtures or chemical combinations thereof, including atomically-doped combinations and including high surface area or activated compounds such as activated alumina.

Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina and alumina-ceria. Exemplary aluminas include large pore boehmite, gamma-alumina and delta/theta alumina. Useful commercial aluminas used as starting materials in exemplary processes include activated aluminas, such as high bulk density gamma-alumina, low or medium bulk density large pore gamma-alumina and low bulk density large pore boehmite and gamma-alumina.

High surface area metal oxide supports, such as alumina support materials, also referred to as "gamma alumina" or "activated alumina." typically exhibit a BET surface area in excess of 60 m$^2$/g, often up to about 200 m$^2$/g or higher. An exemplary refractory metal oxide comprises high surface area γ-alumina having a specific surface area of about 50 to about 300 m$^2$/g. Such activated alumina is usually a mixture of the gamma and delta phases of alumina, but may also contain substantial amounts of eta. Kappa and theta alumina phases. "BET surface area" has its usual meaning of referring to the Brunauer, Emmeu, Teller method for determining surface area by N$_2$ adsorption. Desirably, the active alumina has a specific surface area of about 60 to about 350 m$^2$/g, for example from about 90 to about 250 m$^2$/g.

In certain embodiments, metal oxide supports useful in the catalyst compositions disclosed herein are doped alumina materials, such as Si-doped alumina materials (including, but not limited to 1-10% $SiO_2$—$Al_2O_3$), doped mania materials, such as Si-doped titania materials (including, but not limited to 1-10% $SiO_2$—$TiO_2$) or doped zirconia materials, such as Si-doped $ZrO_2$ (including, but not limited to 5-30% $SiO_2$—$ZrO_2$).

Advantageously, a refractory metal oxide may be doped with one or more additional baste metal oxide materials such as lanthanum oxide, barium oxide, strontium oxide, calcium oxide, magnesium oxide or combinations thereof. The oxidation catalyst composition, in addition to the refractory metal oxide support and catalytically active metal, may further comprise any one or combinations of the oxides of lanthanum, barium, praseodymium, neodymium, samarium, strontium, calcium, magnesium, niobium, hafnium, gadolinium, terbium, dysprosium, erbium, ytterbium, manganese, iron, chromium, tin, zinc, nickel, cobalt or copper.

The metal oxide dopant is typically present in an amount of about 1 to about 20% by weight, based on the weight of the catalyst composition. The dopant oxide materials may serve to improve the high temperature stability of the refractory metal oxide support or function as a sorbent for acidic gases such as $NO_2$, $SO_2$ or $SO_3$.

The dopant metal oxides can be introduced using an incipient wetness impregnation technique or by addition of colloidal mixed oxide particles. Preferred doped metal oxides include baria-alumina, baria-zirconia, baria-titania, baria-zirconia-alumina, lanthana-zirconia and the like.

Thus the refractory metal oxides or refractory mixed metal oxides in the catalyst compositions are typically selected from the group consisting of alumina, zirconia, silica, titania, ceria, for example bulk ceria, manganese oxide, zirconia-alumina, ceria-zirconia, ceria-alumina, lanthana-alumina, baria-alumina, silica, silica-alumina and combinations thereof. Further doping with basic metal oxides provides additional useful refractory oxide supports including but not limited to baria-alumina, baria-zirconia, baria-titania, baria-zirconia-alumina, lanthana-zirconia and the like.

The oxidation catalyst composition may comprise any of the above named refractory metal oxides and in any amount. For example, refractory metal oxides in the catalyst composition may comprise at least about 15, at least about 20, at least about 25, at least about 30 or at least about 35 wt. % (weight percent) alumina where the wt. % is based on the total dry weight of the catalyst composition. The catalyst composition may for example comprise from about 10 to about 99 wt. % alumina, from about 15 to about 95 wt. % alumina or from about 20 to about 85 wt. % alumina.

The oxidation catalyst composition comprises for example from about 15 wt. %, about 20 wt. %, about 25 wt. %, about 30 wt. % or about 35 wt. % to about 50 wt. %, aboul 55 wt. %, about 60 wt. % about 65 wt. % or about 70 wt. % alumina based on the weight of the catalytic composition. Advantageously, the oxidation catalyst composition may comprise ceria, alumina and zirconia or doped compositions thereof.

Optionally, the DOC catalyst composition can further include, either as a separate composition layer or as part of a homogenous mixture with the oxidation catalyst composition, an ammonia sorbent composition effective to adsorb and/or absorb ammonia and release the stored ammonia under certain conditions. Released ammonia may be employed in downstream SCR reactions. For instance, stored ammonia may be released during acceleration of the engine. The ammonia sorbent may comprise a molecular sieve, such as any of the molecular sieves described herein. Advantageously, the ammonia sorbent comprises small pore or medium pore molecular sieves.

The ammonia sorbent is advantageously a zeolite. The zeolite can be a natural or synthetic zeolite such as faujasite, chabazite, clinoptilolite, mordenite, silicalite, zeolite X, zeolite Y, ultrastable zeolite Y, ZSM-5 zeolite, offretite, or a Beta zeolite. Zeolite adsorbent materials may have a high silica to alumina ratio. The zeolites may have a silica/alumina molar ratio of from at least about 5:1, preferably at least about 50:1, with useful ranges of from about 5:1 to 1000:1, 50:1 to 500;1, as well as about 25:1 to 300:1. Suitable Zeolites include ZSM, Y and Beta zeolites. An ammonia adsorbent may comprise a Beta zeolite of the type disclosed in US. Pat. No. 6,171,556, or clinoptilolite.

Catalyst and/or sorbent compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C. for example, about 800° C. and higher and high water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica.

A catalyst and/or sorbent composition as described herein may comprise one or more supports or "carriers" such as refractory inorganic solid oxide porous powders further composing functionally active species.

Catalytic Articles-Substrates

In one or more embodiments, the present catalyst compositions are disposed on a substrate to form a catalytic article. Catalytic articles comprising the substrates are part of an exhaust gas treatment system. Present substrates for catalytic articles are 3-dimensional, having a length and a diameter and a volume, similar to a cylinder. The shape does not necessarily have to conform to a cylinder. The length is an axial length defined by an inlet end and an outlet end. The diameter is the largest cross-section length, for example the largest cross-section if the shape does not conform exactly to a cylinder. In one or more embodiments, the substrate is selected from one or more of a flow-through honeycomb monolith, wall-flow filter, or a particulate filter, described herein below.

Flow-Through Monolith

Any suitable substrate for the catalytic article may be employed, such as a monolithic substrate of the type having fine, parallel gas flow passages extending there through from an inlet or an outlet face of the substrate such that passages are open to fluid flow there through ("flow-through monolith"). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Flow-through monolith substrates for example have a volume of from about 50 $in^3$ to about 1200 $in^3$. Such structures may contain from about 60 to about 900 or more gas inlet openings (i.e., cells) per square inch of cross section, for example from about 200 to about 400 cpsi and a wall thickness of, for example, from about 50 to about 200 microns or about 400 microns.

Figure 2B:
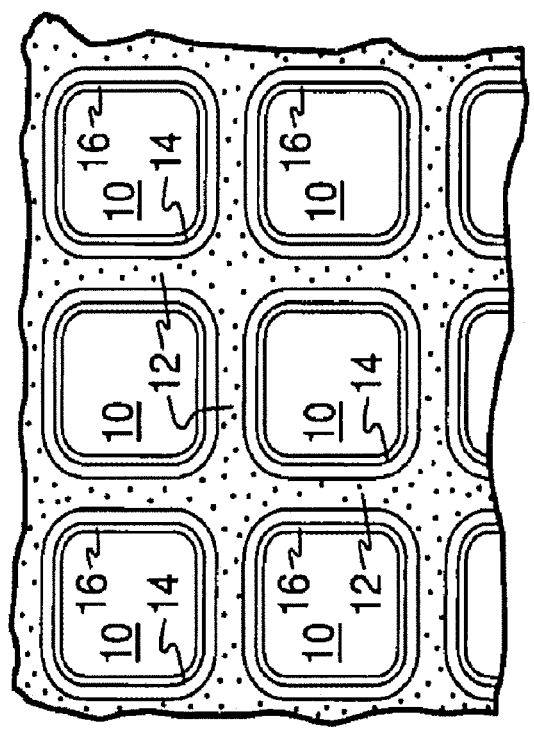
FIG. 2B is a partial cross-sectional view enlarged relative to FIG. 2A and taken along a plane parallel to the end faces of the carrier of FIG. 2A, and which shows an enlarged view of a plurality of the gas flow passages shown in FIG. 2A.
Figure 2A:
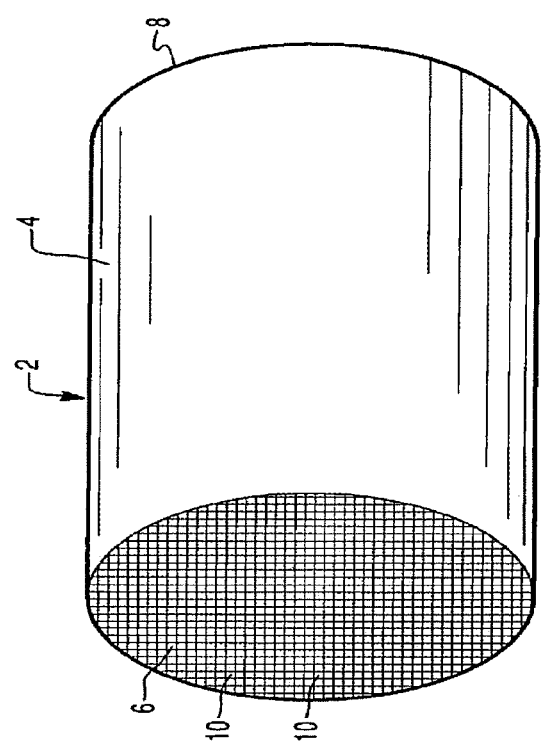
FIG. 2A is a perspective view of a honeycomb-type substrate which may comprise a catalyst composition.

FIGS. 2A and 2B illustrate an exemplary substrate 2 in the form of a flow-through substrate coated with a catalyst composition as described herein. Referring to FIG. 2A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 2B, walls 12 are so dimensioned and configured that gas flow passages 10 have a substantially regular polygonal shape. As shown, the catalyst composition can be applied in multiple, distinct layers if desired. In the illustrated embodiment, the catalyst composition consists of both a discrete bottom layer 14 adhered to the walls 12 of the carrier member and a second discrete top layer 16 coated over the bottom layer 14. The present invention can be practiced with one or more (e.g., 2, 3, or 4) catalyst layers and is not limited to the two-layer embodiment illustrated in FIG. 2B.

In one or more embodiments, the substrate is a ceramic or metal having a honeycomb structure. Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punchouts" in the channel walls. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel, in each ease based on the weight of the substrate.

Examples of metallic substrates include those having straight channels; those having protruding blades along the axial channels to disrupt gas flow and to open communication of gas flow between channels, and those having blades and also holes to enhance gas transport between channels allowing for radial gas transport throughout the monolith.

Monolithic Wall-How Filter

The substrate may be a "flow-through" filter as described above. Alternatively, a catalytic coating may be disposed on a wall-flow filter or soot filter, thus producing a Catalyzed Soot Filter (CSF). In one or more embodiments, the substrate is a particulate filter. As used herein, the terms "particulate filter" or "soot filter" refer to a filter designed to remove particulate matter from an exhaust gas stream such as soot. Particulate filters include, but are not limited to honeycomb wall flow filters, partial filtration filters, wire mesh filters, wound fiber filters, sintered metal filters, and foam filters. SCR articles may include coated wall-flow filters (SCRoF). If a wall-flow substrate is utilized, the resulting system will be able to remove particulate matter along with gaseous pollutants.

The wall-flow filter substrate used for the SCR catalyst composition can be made from materials commonly known in the an such as cordierite, aluminum titanate, silicon carbide, silicon titanate, metals or metal foams.

Wall-flow filter substrates useful for supporting the SCR catalytic coatings have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes. Wall-flow substrates typically have a wall thickness from about 50 microns to about 2000 microns, for example from about 50 microns to about 450 microns or from about 150 microns to about 400 microns.

The walls of the wall-flow filters are porous and generally have a wall porosity of at least about 50% or at least about 60% with an average pore size of at least about 5 microns prior to disposition of the functional coating. For instance, the wall-flow filter will have a porosity of ≥50%, ≥60%, ≥65% or ≥70%. For instance, the wall-flow filter will have a wall porosity of from about 50%, about 60%, about 65% or about 70% to about 75%, about 80% or about 85% and an average pore size of from about 5 microns, about 10, about 20, about 30, about 40 or about 50 microns to about 60 microns, about 70, about 80, about 90 or about 100 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

The wall-flow fiber may have a volume of for instance from about 50 cm$^3$ about 100, about 200, about 300, about 400, about 500, about 600, about 700, about 800, about 900 or about 1000 cm$^3$ to about 1500 cm$^3$, about 2000, about 2500, about 3000, about 3500, about 4000, about 4500 or about 5000 cm$^3$, Useful wall-flow filters typically have an aspect ratio (length/diameter or L/D) of from about 1 to about 20, for example from about 1.0, about 2.0, about 3.0, about 3.5, about 4.0, about 4.5, about 5.0 or about 5.5 to about 6.0, about 6.5, about 7.0, about 7.5, about 8.0, about 8.5, about 9.0, about 9.5, about 10.0, about 11.0, about 12.0, about 13.0, about 14.0, about 15.0, about 16.0, about 17.0, about 18.0, about 19.0 or about 20.0. For instance, the wall-flow filters may have an aspect ratio of from about 3 to about 10. The wall-flow filter optionally has a high aspect ratio, which will allow it to be fitted in a close-coupled position close to the engine. This allows for fast heat-up of the catalyst; the exhaust gas will heat up the catalyst to the operating (catalytic) temperature faster than if it were in an under-floor position. Metallic substrates are advantageously employed in a close-coupled position, allowing for fast heat-up.

The porous wall flow filter can be catalyzed in that the wall of the substrate has thereon one or more catalytic materials. Catalytic materials may be present on the inlet side of the substrate wall alone, the outlet side alone, both the inlet and outlet sides, or the wall itself may consist all, or in part, of the catalytic material. In another embodiment, this invention may include the use of one or more catalyst layers and combinations of one or more catalyst layers on the inlet and or outlet walls of the substrate.

Catalyzed wall-flow filters are disclosed for instance in U.S. Pat. No. 7,229,597, which is incorporated herein by reference. This reference teaches a method of applying a catalytic coating such that the coating permeates the porous walls, that is, is dispersed throughout the walls. Flow-through and wall-flow substrates are also taught, for example, in International Application Publication No. WO2016/070090, which is incorporated herein by reference. Loading of the catalytic coating on a wall-flow substrate will depend on substrate properties such as porosity and wall thickness and typically will be lower than the catalyst loading on a flow-through substrate.

Figure 3:
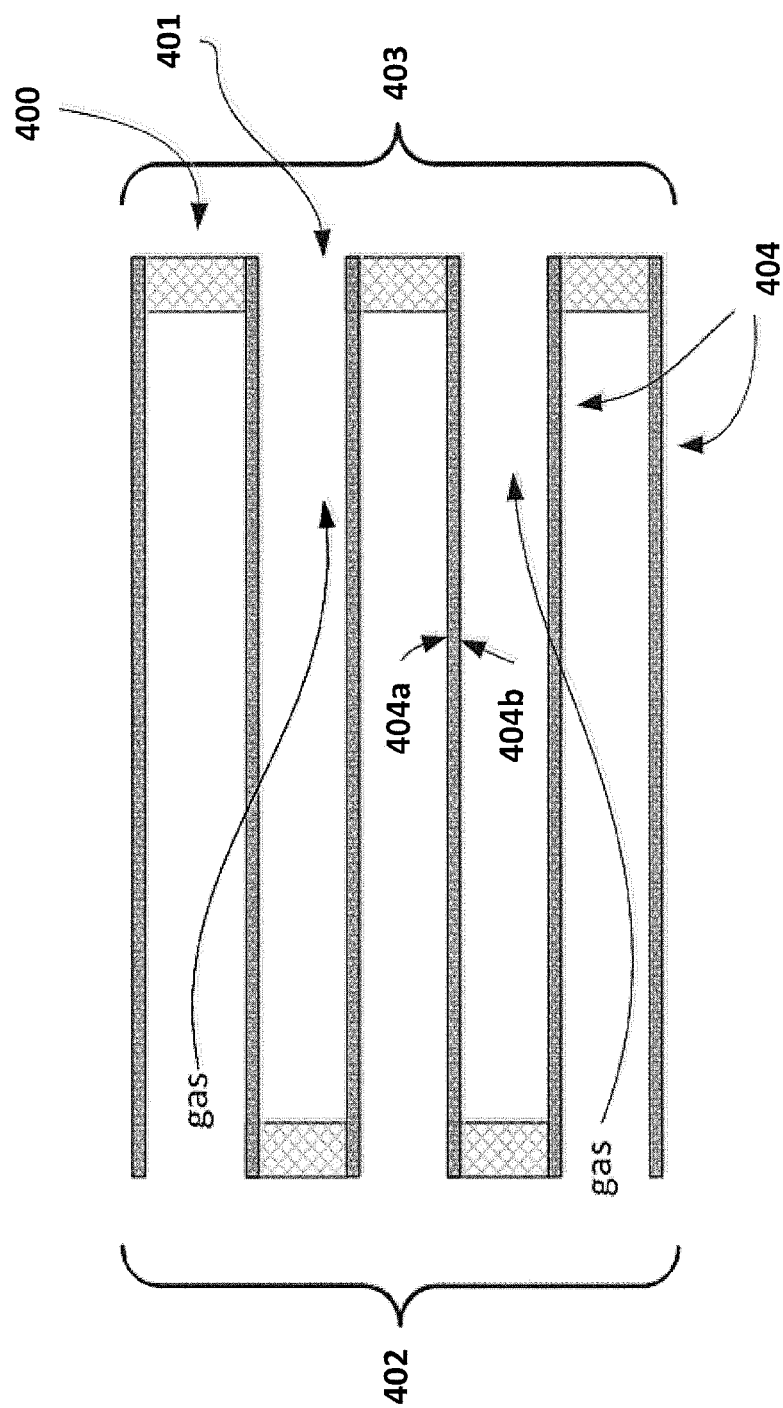
FIG. 3 is a cross-sectional view of a section of a wall-flow filter substrate.

A cross-section view of a wall-flow filter section is illustrated in FIG. 3, showing alternating plugged and open passages (cells). Blocked or plugged ends 400 alternate with open passages 401, with each opposing end open and blocked, respectively. The filter has an inlet end 402 and outlet end 403. The arrows crossing porous cell walls 404 represent exhaust gas flow entering the open cell ends, diffusion through the porous cell walk 404 and exiting the open outlet cell ends. Plugged ends 400 prevent gas flow and encourage diffusion through the cell walls. Each cell wall will have an inlet side 404a and outlet side 404b. The passages are enclosed by the cell walls. The dark squares in FIG. 3 are plugged ends 400 and white squares are open ends 401.

Catalytic Articles-Coatings

A substrate is coated with a catalytic composition to form a catalytic article. The catalytic coating may comprise one or more thin, adherent coating layers disposed on and in adherence to least a portion of a substrate. The coatings are "catalytic coating compositions" or "catalytic coatings". A "catalyst composition" and a "catalytic coating composition" may be synonymous. The catalytic coating composition may comprise a SCR catalyst composition as described herein. The coating layer may comprise the individual functional components, that is, one or more sorbent compositions, an oxidation catalyst composition and an ammonia sorbent composition. The catalytic acting composition may comprise an oxidation catalyst composition as described herein.

A catalyst composition may typically be applied in the form of a washcoat containing supports having catalytically active species thereon. A sorbent composition may typically be applied in the form of a washcoat containing sorption active species. Catalyst and sorbent components may also be combined in a single washcoat. A washcoat is formed by preparing a slurry containing a specified solids content (e.g., about 10 to about 60% by weight) of supports in a liquid vehicle, which is then applied to a substrate and dried and calcined to provide a coating layer. If multiple coating layers are applied, the substrate is dried and calcined after each layer is applied and/or after the number of desired multiple layers are applied. In one or more embodiments, the catalytic material(s) are applied to the substrate as a washcoat. Binders may also be employed as described above.

Different coating layers may be in direct contact with the substrate. Alternatively, one or more "undercoats" may be present, so that at least a portion a catalytic coating layer or coating layers are not in direct contact with the substrate (but rather with the undercoat). One or more "overcoats" may also be present, so that at least a portion of the functional coating layer or layers are not directly exposed to a gaseous stream or atmosphere (but rather are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

The catalytic coating may be on the substrate wall surfaces and/or in the pores of the filter walls, that is "in" and/or "on" the filter walls. Thus, the phrase "a catalytic coating disposed on the substrate" means on any surface, for example on a wall surface and/or on a pore surface. The functional coating may be on and or in only one side of the cell walls, that is only on and/or in the inlet or outlet sides. Alternatively, the catalytic coating may be disposed on both the inlet and outlet sides of the walls.

The catalytic coating may comprise more than one adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80% or about 90% of the substrate length. Another layer may extend from the outlet end towards the inlet end extending about 10%, about 20%, about 30%, about 40%, about 50%, about 60%, about 70%, about 80% or about 90% of the substrate length. Different coating layers may be adjacent to each other and not overlay each other. Alternatively, different layers may overlay a portion of each other, providing a third "middle" zone. The middle zone may for example extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different catalytic compositions may reside in each separate coating layer, for example, one coating layer could comprise an oxidation catalyst composition without any optional sorbent compositions and a second layer could include (or consist entirely of) one or more optional sorbent compositions. Thus, discussion related to different layers may correspond to any of these layers. The catalytic coating may comprise 1, 2 or 3 or more coating layers. The one or more coating layers together comprise the 3 catalytic compositions.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones. The present catalytic coatings may comprise more than one identical layer.

Figure 4B:
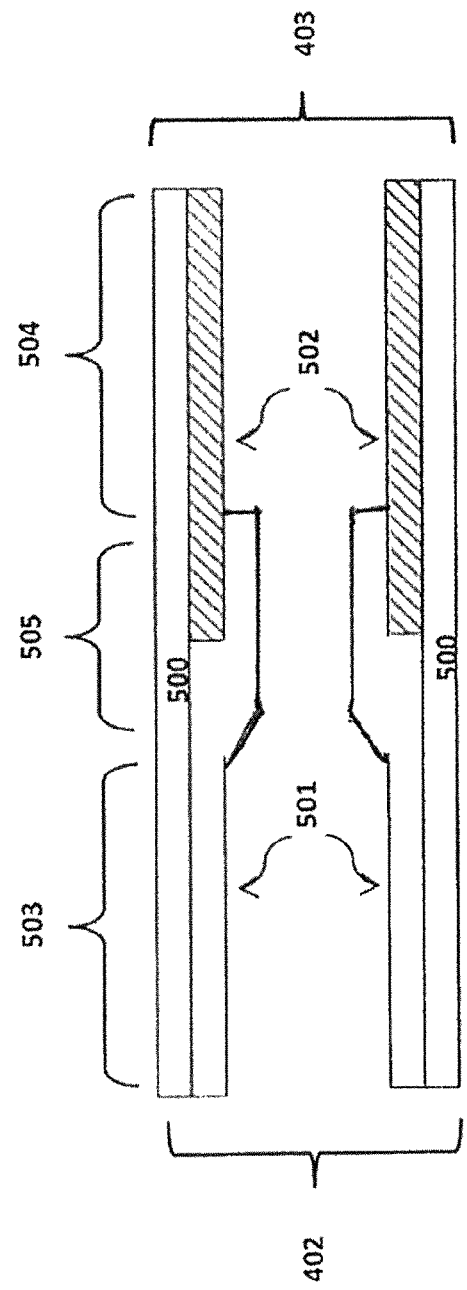

FIGS. 4A, 4B and 4C show some possible coating layer configurations for a substrate with two coating layers, for example, two SCR coating layers. Shown are substrate walls 500 onto which coating layers 501 and 502 are disposed. This is a simplified illustration, and in the case of a porous wall-flow substrate, not shown are pores and coatings in adherence to pore walls and not shown are plugged ends. In FIG. 4A, coating layer 501 (e.g., the first SCR catalyst) extends from the inlet 402 to the outlet 403 about 50% of the substrate length; and coating layer 502 (e.g., base metal containing molecular sieve SCR catalyst) extends from the outlet to the inlet about 50% of the substrate length and the coating layers are adjacent each other, providing an inlet upstream zone 503 and an outlet downstream zone 504. In FIG. 4B, coating layer 502 (e.g., base metal-containing molecular sieve SCR catalyst) extends from the outlet about 50% of the substrate length and layer 501 (e.g., the first SCR catalyst) extends from the inlet greater than 50% of the length and overlays a portion of layer 502, providing an upstream zone 503, a middle zone 505 and a downstream zone 504. In FIG. 4C, coating layers 501 and 502 each extend the entire length of the substrate with layer 501 overlaying layer 502. The substrate of FIG. 4C does not contain a zoned coating configuration. FIGS. 4A, 4B and 4C may be useful to illustrate coating compositions on the wall-flow substrate or the flow-through substrate of, for example, an SCR catalytic article or a DOC article.

The catalytic coating, as well as each zone of a catalytic coating of any section of a coating, is present on the wall-flow-filter substrate at a loading (concentration) of for instance from about 3.0 g/in$^3$ to about 6.0 g/in$^3$, or from about 3.2, about 3.4, about 3.6, about 3.8, about 4.0, about 4.2 or about 4.4 g/in$^3$ to about 4.6 g/in$^3$, about 4.8 g/in$^3$, about 5.0 g/in$^3$, about 5.2 g/in$^3$, about 5.4 g/in$^3$, about 5.6 g/in$^3$, about 5.8 g/in$^3$, or about 6.0 g/in$^3$ based on the wall-flow substrate. This refers to dry solids weight per volume of the wall-flow substrate. Concentration is based on a cross-section of a substrate or on an entire substrate.

When present on a substrate, for example a honeycomb monolith substrate. SCR catalyst compositions are generally present at a concentration of, for instance, from about 0.3 to 4.5 g/in$^3$, or from about 0.4, about 0.5, about 0.6, about 0.7, about 0.8, about 0.9 or about 1.0 g/in$^3$, to about 1.5 g/in$^3$, about 2.0 g/in$^3$, about 2.5 g/in$^3$, about 3.0 g/in$^3$, about 3.5 g/in$^3$ or about 4.0 g/in$^3$, based on the substrate. Concentration of a catalyst composition, or any other component, on a substrate refers to concentration per any one three-dimensional section or zone, for instance any cross-section of a substrate or of the entire substrate.

In some embodiments, the SCR catalytic article includes a first and second SCR catalyst. The first SCR catalyst and the second, SCR catalyst, for example a base metal-containing molecular sieve, are present in the catalytic coating at weight levels, for instance, at a weight ratio of from about 1:10, about 1:9, about 1:8, about 1:7, about 1:6, about 1:5, about 1:4, about 1:3, about 1:2 or about 1:1 to about 2:1, about 3:1, about 4:1, about 5:1, about 6:1, about 7:1, about 8:1, about 9:1 or about 10:1.

In one embodiment, the oxidation catalyst composition of the DOC is coated on a flow-through monolith substrate. The flow-through monolith is ceramic or metallic as described above, for example, a material selected from cordierite, aluminum titanate, silicon carbide, silicon titanate, composite, metal or metal foam. The PGM component of the oxidation catalyst composition is for example present from about 5 $g/ft^3$, 10 $g/ft^3$, about 15 $g/ft^3$, about 20 $g/ft^3$, about 40 $g/ft^3$ or about 50 $g/ft^3$ to about 70 $g/ft^3$, about 90 $g/ft^3$, about 100 $g/ft^3$, about 120 $g/ft^3$, about 130 $g/ft^3$, about 140 $g/ft^3$, about 150 $g/ft^3$, about 160 $g/ft^3$, about 170 $g/ft^3$, about 180 $g/ft^3$, about 190 $g/ft^3$, about 200 $g/ft^3$, about 210 $g/ft^3$, about 220 $g/ft^3$, about 230 $g/ft^3$, about 240 $g/ft^3$ or about 250 $g/ft^3$, based on the volume of the substrate.

Exhaust Gas Treatment System and Methods

An aspect of the present invention is directed to an exhaust gas treatment system and method. In one or more embodiments, an exhaust gas treatment system of the invention comprises an engine, particularly a lean burn engine such as a diesel engine or lean burn gasoline engine, an SCR catalyst unit downstream from the engine, and an ammonia generation system as described herein.

In use, the exhaust gas treatment system treats an exhaust gas stream of an engine by passing the exhaust gas stream into an exhaust treatment system that includes an SCR catalyst unit, producing gaseous ammonia; and transferring the gaseous ammonia through art injector into the exhaust gas stream such that the gaseous ammonia disperses within the exhaust gas stream upstream of the SCR catalyst unit.

In the present exhaust gas treatment systems and methods, the exhaust gas stream is passed through the article or treatment system by entering the upstream end and exiting the downstream end. The inlet end of a substrate is synonymous with the "upstream" end or "from" end. The outlet end is synonymous with the "downstream" end or "rear" end. A substrate will have a length and a diameter. The treatment system is in general downstream of and in fluid communication with an internal combustion engine.

Figure 5:
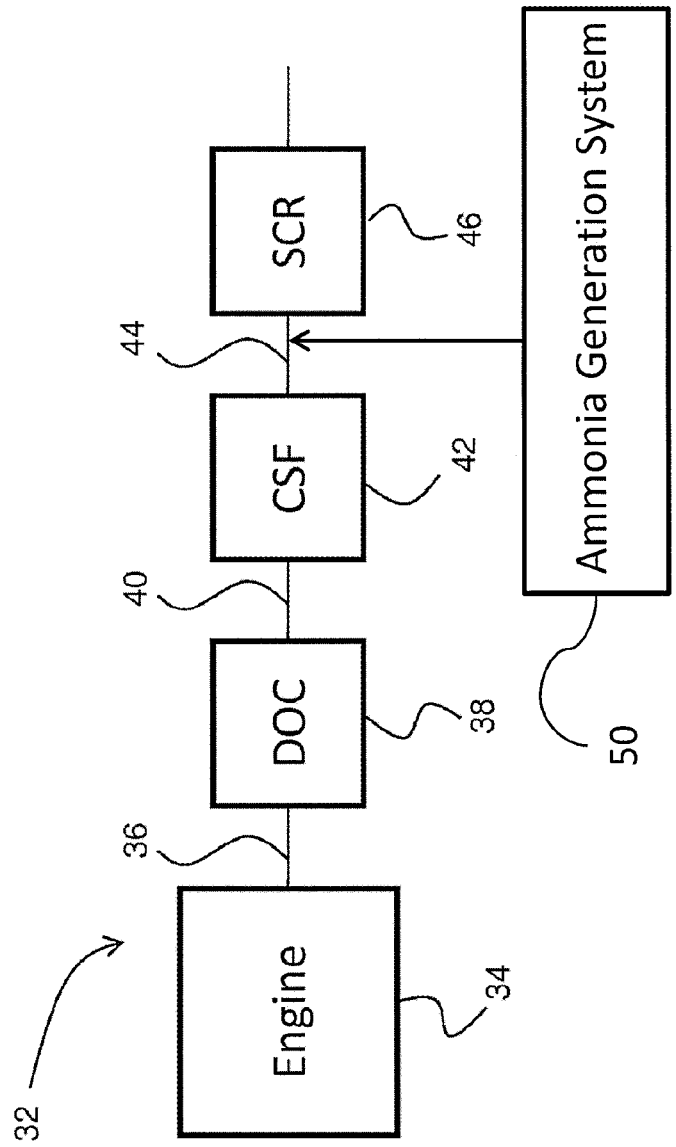
FIG. 5 is a schematic depiction of an embodiment of an emission treatment system downstream of and in fluid communication with an internal combustion engine in which an ammonia generation system of the invention is utilized.

One exemplary emissions treatment system is illustrated in FIG. 5, which depicts a schematic representation of an emission treatment system 32, downstream of and in fluid communication with an internal combustion engine 34. As shown, an exhaust gas stream containing gaseous pollutants and particulate matter is conveyed via exhaust pipe 36 from an engine 34 to an optional diesel oxidation catalyst (DOC) 38, comprising an oxidation catalyst composition as disclosed herein.

The present treatment system may also contain an article suitable to inject ammonia upstream of the DOC 38, such as by using all or a portion of the ammonia generated in ammonia generation system 50. An ammonia injection article will be in fluid communication with the treatment system and may comprise reservoirs, pumps, valves, mixing boxes, etc. Other articles not shown may therefore include reservoirs, pumps, valves, mixing boxes, etc.

The exhaust gas treatment system may comprise a hydrogen injection article, configured to inject or release hydrogen upstream of the oxidation catalyst unit 38. For example, the hydrogen injection article can be configured for intermittent injection or release of stored hydrogen. The system may be configured, for example, to inject or release stored hydrogen during a cold-start period. Hydrogen may be brought onboard in a hydrogen storage article, or may be generated on-board from water-splitting or from ammonia decomposition. In some embodiments, the hydrogen injection article comprises a check valve. One exemplary emissions treatment system is illustrated in FIG. 6, which depicts a schematic representation of an emission treatment system 32, downstream of and in fluid communication with an internal combustion engine 34, in which all or a portion of the hydrogen generated in hydrogen generation system 52 is introduced downstream of engine 34 and upstream of DOC article 38.

Figure 6:
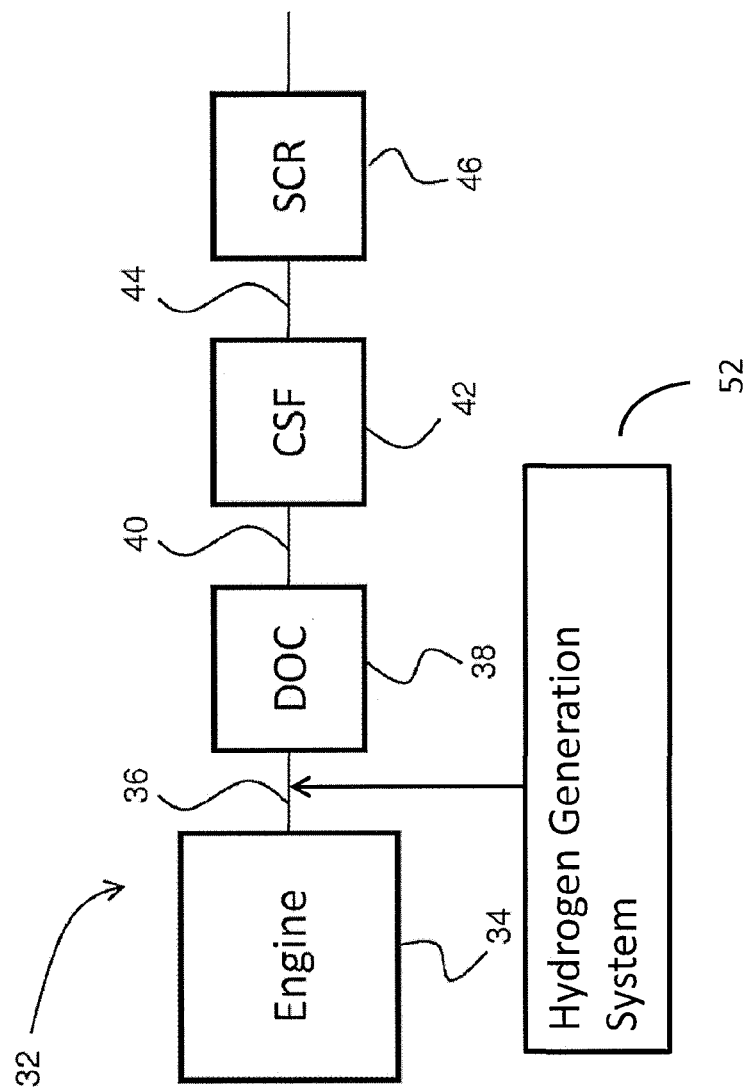
FIG. 6 is a schematic depiction of an embodiment of an emission treatment system downstream of and in fluid communication with an internal combustion engine in which a hydrogen generation system of the invention is utilized.

Referring to FIGS. 5 and 6, the exhaust stream is next conveyed via exhaust pipe 40 to an optional catalyzed soot filter (CSF) 42, which traps particulate matter present within the exhaust gas stream. The CSF 42 is optionally catalyzed for passive or active soot regeneration. The CSF 42 can optionally include an SCR catalyst composition for the conversion of $NO_x$ present in the exhaust gas.

After removal of particulate matter, via CSF 42, the exhaust gas stream is conveyed via exhaust pipe 44 to a downstream SCR catalyst unit 46 for the further treatment and/or conversion of $NO_x$. Exemplary SCR catalyst units 46 are described in greater detail below. As shown in FIG. 5, the ammonia generation system 50, explained in greater detail above, is positioned to inject ammonia into exhaust pipe 44 upstream of the SCR catalyst unit 46. As shown in FIG. 6, the hydrogen generation system 52, explained in greater detail above, is positioned to introduce hydrogen into exhaust pipe 36 upstream of the DOC catalyst unit 38.

In one embodiment, the exhaust gas treatment system does not include the optional CSF component and instead the SCR catalyst unit 46 utilizes a wall-flow filter substrate such that the unit functions both as a soot filter and an SCR catalyst. In such an embodiment, the exhaust gas can exit the DOC 38, for example, and thereafter directly enter the SCR catalyst filter unit 46 with no intervening treatment unit.

The one or more SCR catalyst compositions in SCR catalyst unit 46 can be in separate layers on the wall-flow substrate. For example, a first SCR coating layer comprising a first SCR catalyst and a second SCR coating layer comprising a base metal-containing molecular sieve can be zone coated, wherein the first SCR coating layer is proximal to the from upstream end and the second SCR coating layer is proximal to the rear downstream end.

The oxidation catalyst of DOC 38 is suitable for example to oxidize NO and/or CO and/or HC components of exhaust gas. In the optional DOC 38, unburned gaseous and non-volatile hydrocarbons and carbon monoxide are largely combusted to form carbon dioxide and water. In addition, a proportion of the NO of the $NO_x$ component may be oxidized to $NO_x$ in the DOC. Suitable oxidation catalysts advantageously comprise a platinum group metal (PGM) dispersed on a refractory metal oxide support, as disclosed herein.

The DOC unit is advantageously in a close-coupled position. A close-coupled position is, for instance, within about 12 inches (in) from where individual cylinder exhaust pipes join together, for instance from about 0.5 in, about 1 in, about 2 in, about 3 in, about 4 in or about 5 in to about 6 in, about 7 in, about 8 in, about 9 in, about 10 in, about 11 in or about 12 in. This means "from the exhaust manifold".

The systems disclosed heron may advantageously be integrated into the engine electronic management algorithm (electronic management system), for instance as is urea injection for SCR functions.

In a method of the present invention, hydrogen, e.g., generated as described herein, is pulsed into an exhaust gas stream upstream of an oxidation catalyst composition, for example a diesel oxidation catalyst (DOC) as described herein, during a cold-start period (i.e., the exhaust gas stream is at a temperature of ≤150° C.). The pulsed hydrogen serves to enhance low temperature oxidation $NO_x$ and or CO and/or HC pollutants.

The present articles, systems and methods are suitable for treatment of exhaust gas streams from mobile emissions sources such as trucks and automobiles. Articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Example 1

Two-Layer Catalytic Coating on Substrate (DOC Article)

A bottom coat catalyst slurry containing milled alumina powder impregnated with Pd (0.5 wt. %), Ba (0.8 wt. %) and Pt (0.3 wt. %) was prepared and adjusted to a pH of 4.5 to 5.0 with nitric acid. The bottom coat slurry had a solid content of 38 wt. %. The bottom coat slurry was applied to the entire core length of a 1"×3", 400 cpsi (cell per square inch) honeycomb substrate via a washcoat technique. The coated substrate was air dried at 120° C. and calcined at 500° C. for 1 hour, providing a coating loading of 1.6 $g/in^3$.

A top coat slurry containing alumina 5 wt. % Mn and Pt-aminc (3.3 wt. %) was prepared, milled and adjusted to a pH of 4.5 to 5.0 with nitric acid. The top coat slurry had a solid concentration 37 wt. %. Zeolite beta (0.35 $g/in^3$) was then added to the top coat slurry. The top coat slurry was applied over the entire bottom coat and s dried and calcined as the bottom coat, to provide a total coating loading of 2.5 $g/in^3$ and a total PGM loading of 50 $g/ft^3$ with a Pt/Pd weight ratio of 3/1.

Example 2

Three-Layer Catalytic Coating on Substrate (DOC Article)

A bottom coat catalyst slurry containing milled alumina powder and a Ce/Al (50/50 wt. %) powder (weight ratio of about 1/6) was prepared to have a solid concentration of from 32 to 35 wt. %. Small amounts of zirconium acetate and alumina sol were added as binders. The slurry was coated on a 400 cpsi 1"×3" honeycomb to provide a bottom coat at 1.5 $g/in^3$.

A middle coat catalyst slurry was prepared by impregnating Pd nitrate on a Mn/Al support (5 wt. % Ma) followed by adding a Ba hydroxide solution. The impregnated powder was added to a Pt solution and the pH adjusted to 4.5 to 5 with nitric acid. This slurry was coated onto the bottom-coated core to provide an additional coating loading of 1.8 $g/in^3$ and a Pt/Pd weight ratio of 18/14.

A top coat slurry was prepared by impregnating Pd nitrate on a Mn/Al support (5 wt. % Mn) followed by Ba hydroxide solution. The impregnated powder was added to a Pt solution and the pH adjusted to 4.5 to 5 with nitric acid. Zeolite beta was added to the slurry. The top coat slurry was applied to the the coated core, providing a three-layer coated core, with a further coating loading of 1.1 $g/in^3$ and Pt/Pd weight ratio of 17/3. Total PGM loading was 52 $g/ft^3$.

Example 3

Exhaust Gas Treatment

Figure 7:
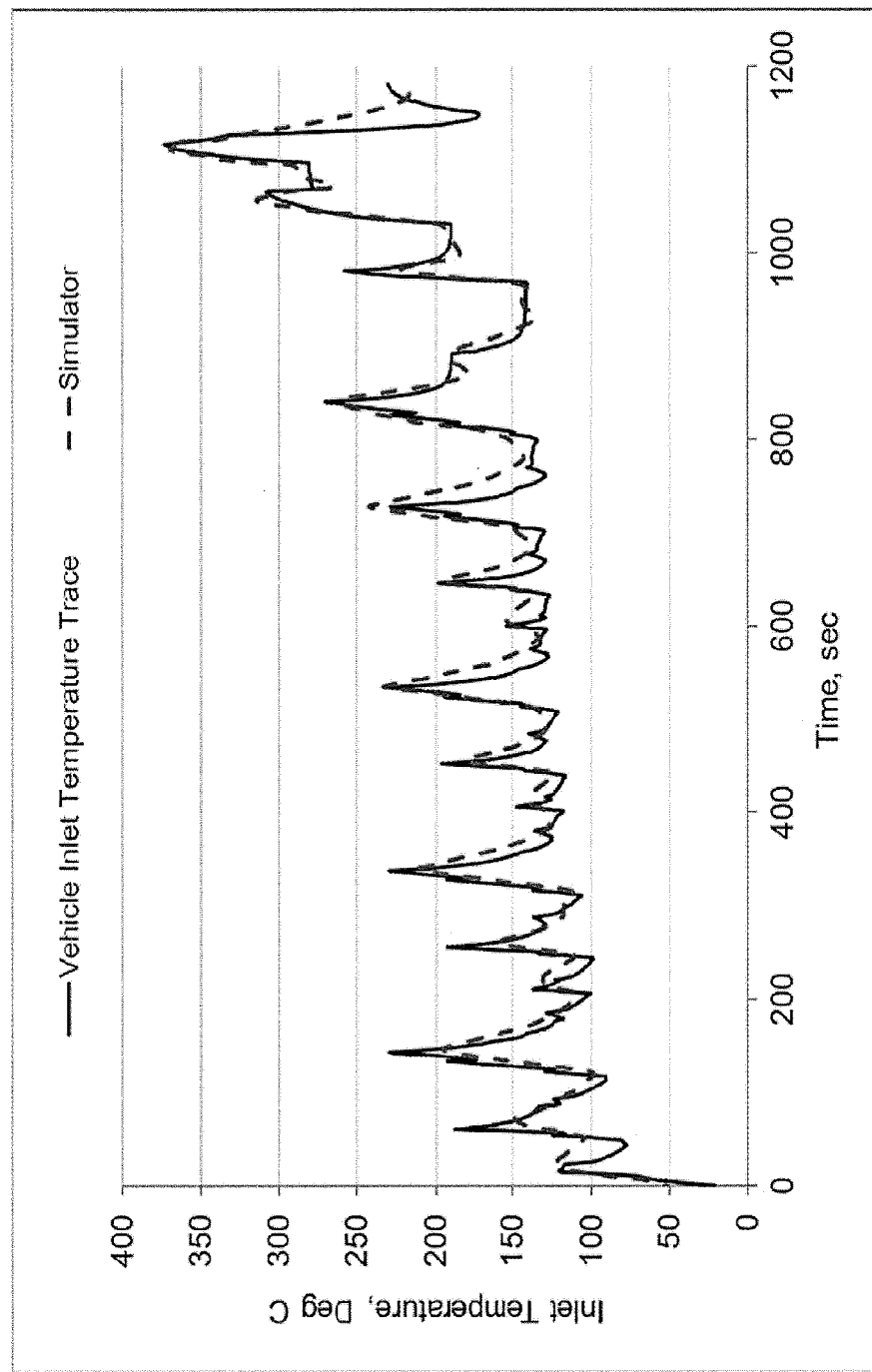
FIG. 7 is a graph illustrating the simulated exhaust gas flow conditions of an engine out exhaust gas for the NEDC cycle.

The coated cores of examples 1 and 2 were hydrothermally aged in a tube furnace at 800° C. for 16 hours with a feed gas composition of 10% $H_2O$, 10% $O_2$, balance $N_2$. The aged samples were evaluated in a lab reactor equipped to conduct a simulated NEDC (New European Driving Cycle) with a separate feed line for $H_2/N_2$ serving as the source for $H_2$ pulse. The simulated exhaust gas flow conditions, and the feed compositions of an engine out exhaust gas for the NEDC cycle, are represented in FIG. 7. FIG. 8 provides a graphical comparison of engine out CO emissions between the vehicle trace and simulator.

Hydrogen was pulsed into the exhaust stream during the first 300 seconds of the cycle with a 1% hydrogen concentration in a $H_2/N_2$ feed gas. Hydrogen injection was performed via a separate (non-preheated) line carrying the $H_2/N_2$ feed gas. Results were obtained for % conversion of HC, CO and NO for each of coated core examples 1 and 2. The data obtained for the coated substrate of Example 1 with % $H_2$ pulse vs. no $H_2$ pulse are as follows:

|  | HC | CO | NO |
|---|---|---|---|
| no $H_2$ | 69 | 56 | 33 |
| 1% $H_2$ | 82 | 84 | 42 |

Hydrogen was pulsed into the exhaust stream during the cold-start period, that is, during the first 200 seconds of the cycle with a hydrogen concentration in a $H_2/N_2$ feed gas. Hydrogen injection was performed via a separate (non-preheated) line carrying the $H_2/N_2$ feed gas. Results for % conversion of HC, CO and NO are as follows for the coated substrate of Example 2 with $H_2$ pulse vs. no $H_2$ pulse.

|  |  | HC | CO | NO | average inlet temp (° C.) |
|---|---|---|---|---|---|
|  | no H$_2$ | 61 | 29 | 21 | 120 |
| 100-200 sec | 0.5% H$_2$ | 66 | 34 | 32 | 124 |
| 100-200 sec | 1% H$_2$ | 68 | 38 | 33 | 121 |
| 0-100 sec | 1% H$_2$ | 80 | 70 | 42 | 123 |
| 0-200 sec | 1% H$_2$ | 80 | 68 | 47 | 118 |

The data demonstrate that hydrogen pulsing is highly effective towards the abatement of pollutants in an exhaust gas stream.

The coated substrate of Example 1 was evaluated under a steady state light-off test with a feed composition having 1500 ppm CO, 100 ppm NO, 10% H$_2$O, 4.6% CO$_2$, 14% O$_2$, 40 ppm C$_3$H$_6$, 30 ppm CH$_4$ and 294 ppm Cl (liquid HC having a molar ratio of 64/36 decane/toluene). The temperature ramp was 20° C./min from ea. 80° C. to 380° C. Results are presented below as ° C.

|  | CO (T$_{50}$) | CO (T$_{80}$) | HC (T$_{80}$) |
|---|---|---|---|
| no H$_2$ | 186 | 193 | 210 |
| 1% H$_2$ up to 120° C. | 184 | 190 | 210 |
| 1% H$_2$ up to 180° C. | 153 | 158 | 173 |
| 1% H$_2$ 120-180° C. | 156 | 161 | 176 |

This data demonstrates that hydrogen injection has a greater impact on pollution abatement from 120° C. and above.

NO$_2$/NO$_x$ ratio is an important factor for downstream SCR performance in a diesel exhaust gas treatment system, especially at the low temperature end (≤200° C.). FIG. 9 demonstrates that hydrogen injection created a highly desirable NO$_2$/NO$_x$ ratio m the low temperature range and typical CO/HC and NO$_2$/NO$_x$ ratios resumed when the H$_2$ pulse was supped, indicating that hydrogen injection did not alter the catalyst at all. Thus, intermittent or "pulsed" hydrogen injection is desirable.

What is claimed is:

1. A vehicle on-board system comprising:
    an ammonia source comprising a reservoir comprising an ammonia/organic solvent solution; and
    a catalytic reactor in fluid communication with the ammonia source and configured to decompose ammonia from the ammonia source to generate hydrogen.

2. The vehicle on-board system of claim 1, wherein:
    the ammonia/organic solvent solution comprises from about 1% to about 70% ammonia by weight, based on the weight of the ammonia/organic solvent solution; and
    the organic solvent comprises an alkanol and/or a glycol.

3. The vehicle on-board system of claim 1, further comprising a phase separator configured to isolate ammonia from the ammonia/organic solvent solution.

4. The vehicle on-board system of claim 3, further comprising an ammonia storage container associated with the phase separator.

5. The vehicle on-board system of claim 1, wherein the catalytic reactor comprises an ammonia decomposition catalyst disposed on one or more surfaces contained within the catalytic reactor.

6. The vehicle on-board system of claim 1, wherein the catalytic reactor further comprises a hydrogen separation membrane.

7. The vehicle on-board system of claim 1, further comprising a hydrogen storage article.

8. The vehicle on-board system of claim 1, further comprising a hydrogen injection article configured to introduce hydrogen intermittently on-demand into an exhaust gas stream of an internal combustion engine.

9. The vehicle on-board system of claim 1, further comprising an ammonia injection article, wherein the ammonia injection article is in fluid communication with a selective catalytic reduction (SCR) article and configured to introduce ammonia upstream of the SCR article.

10. The vehicle on-board system of claim 1, configured to introduce hydrogen into an exhaust gas stream wherein the exhaust gas stream is at a temperature of ≤150° C.

11. A vehicle comprising the vehicle on-board system of claim 1.

12. A method for on-board vehicle generation of hydrogen, the method comprising isolating ammonia from an ammonia/organic solvent solution contained in a reservoir, wherein the ammonia/organic solvent solution comprises from about 1% to about 70% ammonia by weight, based on the weight of the ammonia/organic solvent solution, and the organic solvent comprises an alkanol and/or a glycol; and
    catalytically decomposing ammonia to generate hydrogen.

13. The method of claim 12, further comprising isolating ammonia via a phase separator and optionally storing the isolated ammonia in an ammonia storage container.

14. The method of claim 12, wherein catalytically decomposing the ammonia is performed in a catalytic reactor comprising an ammonia decomposition catalyst disposed on one or more surfaces contained within the catalytic reactor.

15. The method of claim 14, wherein the catalytic reactor is in thermal communication with a heat exchanger; and wherein the heat exchanger is optionally in thermal communication with an internal combustion engine.

16. The method of claim 14, wherein the catalytic reactor comprises a hydrogen separation membrane comprising palladium.

17. The method of claim 12, further comprising storing hydrogen in a hydrogen storage article.

18. The method of claim 12, further comprising introducing hydrogen intermittently on-demand into an exhaust gas stream of an internal combustion engine, wherein the exhaust gas stream is at a temperature of ≤180° C.; and, optionally introducing ammonia into the exhaust gas stream of the internal combustion engine.

* * * * *